United States Patent
Sun

(10) Patent No.: US 9,469,357 B2
(45) Date of Patent: Oct. 18, 2016

(54) TRACK WHEEL WITH DIVISION OF WORK BETWEEN TRACK AND CHAIN, METHODS FOR FITTING PITCH RAILS TO FLEXIBLE CHAIN AND FOR BUFFERING PRE-STRESS, AND OPEN-CLOSE TYPE WHEEL AXLE

(71) Applicant: CHONGQING NENGMA TECHNOLOGY CO., LTD, Chongqing (CN)

(72) Inventor: Jihua Sun, Chongqing (CN)

(73) Assignee: CHONGQING NENGMA TECHNOLOGY CO., LTD, Chongqing (CN)

( * ) Notice: Subject to any disclaimer, the term of this patent is extended or adjusted under 35 U.S.C. 154(b) by 0 days.

(21) Appl. No.: 14/412,202

(22) PCT Filed: Jun. 28, 2013

(86) PCT No.: PCT/CN2013/078419
§ 371 (c)(1),
(2) Date: Dec. 30, 2014

(87) PCT Pub. No.: WO2014/005495
PCT Pub. Date: Jan. 9, 2014

(65) Prior Publication Data
US 2015/0336624 A1     Nov. 26, 2015

(30) Foreign Application Priority Data
Jul. 1, 2012  (CN) .......................... 2012 1 0221787

(51) Int. Cl.
| | |
|---|---|
| *B62D 55/108* | (2006.01) |
| *B62D 55/26* | (2006.01) |
| *B62D 55/15* | (2006.01) |
| *B62D 55/14* | (2006.01) |
| *B62D 55/20* | (2006.01) |
| *B62D 55/28* | (2006.01) |

(52) U.S. Cl.
CPC ............. *B62D 55/108* (2013.01); *B62D 55/14* (2013.01); *B62D 55/15* (2013.01); *B62D 55/20* (2013.01); *B62D 55/26* (2013.01); *B62D 55/283* (2013.01); *Y10T 29/49494* (2015.01)

(58) Field of Classification Search
CPC .... B62D 55/08; B62D 55/084; B62D 55/10; B62D 55/104; B62D 55/108; B62D 55/14; B62D 55/15; B62D 55/18; B62D 55/20; B62D 55/26; B62D 55/28; B62D 55/283; B62D 55/286
USPC ....... 305/129, 130, 131, 136, 137, 138, 139, 305/140, 141, 142
See application file for complete search history.

(56) References Cited

U.S. PATENT DOCUMENTS

2011/0148187 A1* 6/2011 Lyons .................. B62D 55/275
                                                              305/46

FOREIGN PATENT DOCUMENTS

| CN | 1262186 A | * | 8/2000 | |
| GB | 423445 A | * | 2/1935 | ............. B62D 55/28 |

OTHER PUBLICATIONS

Mechanical translation of CN126186A, Aug. 2000.*

*Primary Examiner* — John Walters

(57) ABSTRACT

The present invention relates to a caterpillar track wheel with division of work between track and chain, methods for fitting unit track with flexible chain ring, methods for buffering prestress, and an open-dose type axle housing. Since a structure that each unit track is separated from a flexible chain ring is adopted, the thickness of the unit tracks does not influence the winding stress of the flexible chain ring and the unit tracks without thickness limitation can effectively disperse stress from the ground to more supporting wheels. Since the thinner flexible chain ring is only responsible for serially connecting the unit tracks and transmitting power, the winding stress and the tension change are reduced.

9 Claims, 15 Drawing Sheets

TRACK WHEEL WITH DIVISION OF WORK BETWEEN TRACK AND CHAIN, METHODS FOR FITTING PITCH RAILS TO FLEXIBLE CHAIN AND FOR BUFFERING PRE-STRESS, AND OPEN-CLOSE TYPE WHEEL AXLE

FIELD OF THE INVENTION

The present invention relates to a caterpillar track device, in particular to a caterpillar track wheel with division of work between track and chain.

BACKGROUND OF THE INVENTION

Current caterpillar track devices have some significant defects, one of which is that, when meeting a vertical wall obstacle, a caterpillar track is jacked up in a gap thereof between two supporting wheels by the obstacle to semi-enclose the obstacle. The jacking-up of the caterpillar track caused by the obstacle makes the caterpillar track protrude upwards. The tension of the caterpillar track is transmitted onto tensioning wheels, causing change of the tension and hence the increasing of power consumption. Another major defect is that, when the caterpillar track is jacked up by the obstacle and protrude upwards, a plurality of supporting wheels which roll on the caterpillar track will start to climb in turn over the obstacle from the lowest position of the obstacle. The number of times of the caterpillar track's climbing over the obstacle depends on the number of the supporting wheels climbing over the obstacle, and each climbing of the supporting wheels over the obstacle consumes approximate additional power. In a traditional caterpillar track device, if the thickness of a caterpillar track such as a rubber caterpillar track is increased to disperse the ground stress onto more supporting wheels, the winding stress is also increased correspondingly during large-curvature revolution. If the thickness of a rigid caterpillar track is increased, the change of tension is also increased correspondingly during large-curvature revolution. In view of the effect of dispersing the ground stress of the traditional caterpillar device, the transverse stress of the rigid caterpillar track is basically and wonderfully dispersed, whilst the dispersion of the longitudinal stress is insufficient. However, neither the transverse stress nor the longitudinal stress of the rubber caterpillar track is wonderful y dispersed, the stress of the obstacle causes a rubber track or caterpillar track between two supporting wheels to be upwards arched and curved, supporting wheels at the rear need to climb over the arched rubber track or caterpillar track one by one, and consequently the power consumption of each supporting wheel is increased.

For this reason, the inventor ever invented a deformable wheel which was patented as Chinese patent No. 99114647.6. In this patent, an axle housing is adopted for installing supporting wheels and track fixing wheels. Vertical supporting wheels which are linearly distributed on the axle housing are adopted for rolling on horizontal rolling surfaces of unit tracks. At least two rows of inclined track fixing wheels which are linearly and symmetrically distributed and fixed on the axle housing are adopted for rolling on inclined rolling surfaces of the unit tracks, rigid unit tracks exceeding the length of one wheel are serially connected by a track threading chain to form a ring caterpillar track, and the unit tracks play a role of longitudinally dispersing the ground stress onto the supporting wheels. Therefore, the deformable wheels form an integral wheel relative to the ground. Under a rigid axle housing structure with certain radian, the entire deformable wheel assembly can climb over an obstacle on the ground by doing work only once.

Since the supporting wheels and the inclined track fixing wheels are simultaneously used in the patent of the deformable wheel, the inclined rolling surfaces need to be arranged on the unit tracks to allow the inclined track fixing wheels to roll thereon to fix the unit tracks, which has a comparatively complex structure. At the end of large-curvature revolution at the front and rear ends of a track-chain integrated-type caterpillar track, rigid back surfaces of the unit tracks cause fulminant impact on the flexible chain ring, causing very big noise whilst it is difficult to fixedly assemble and disassemble the supporting wheels on and disassemble it from the axle housing, which cause the production and the maintenance difficult.

SUMMARY OF THE INVENTION

The purpose of the present invention is to provide a caterpillar track wheel, the internal transmission and caterpillar track induction of which are similar to those of a traditional caterpillar track, the ground running manner of which is similar to that of a wheel, and the contact of which with the ground can be not only longitudinal point contact like a vehicle, but also surface contact like a caterpillar track. The ground running manner of a traditional caterpillar track is that, when a protruding obstacle is met, a flexible chain ring is inwards depressed and semi-encloses the obstacle, supporting wheels repeat the behavior of climbing over the obstacle sequentially on the flexible chain ring, and thus the power consumption is comparatively great. On the other hand, for the caterpillar track wheel according to the present invention which adopts an axle housing structure, since an axle housing is used for integrally fixing the supporting wheels in a distributed manner, the supporting wheels at this moment act like balls in a bearing, and the flexible chain ring and the unit tracks at this moment like outer bearing bushes in the bearing. The obstacle stress is dispersed onto more supporting wheels through the unit tracks serially connected onto the flexible chain ring, and the caterpillar track wheel can climb over the obstacle in one time while passing the obstacle, just like a wheel. In order to facilitate the assembling and disassembling of the supporting wheels, the present invention adopts a method for opening and closing axle housing, in which the axle housing is divided into an upper axle housing and a lower axle housing at the position of an axle hole, and the upper axle housing and the lower axle housing jointly form a complete axle hole to fix an axle. The running manner on the ground of the caterpillar track wheel with the unit track structure and the axle housing structure can be considered as that of an integral wheel. Since the present invention applies a track-chain work-division-type structure to a caterpillar track device, the fulminant impact caused by the unit tracks in a track-chain structure to the flexible chain ring during revolution is reduced. Moreover, the present invention further provides a method for connecting unit track and flexible chain ring which is simpler and more convenient and ensures firmer connection, and a method for opening and closing an axle housing to facilitate assembling and disassembling supporting wheels.

In order to make the winding stress and the tensioning stress be smaller during large-curvature revolution and winding of a common caterpillar track or rubber caterpillar track, to disperse the stress from the ground onto more longitudinal supporting wheels and transverse supporting wheels as possible and to ensure more stable operation, firmer connection, greater convenience in disassembling and assembling of the supporting wheels, lower running noise and lower running power consumption, the present invention adopts the following technical embodiments:

Embodiment 1

A caterpillar track wheel with division of work between track and chain comprises axle housings, track guide wheels, a driving wheel, track supporting wheels, tensioning wheels, a flexible chain ring and unit tracks used for dispersing stress on supporting wheels from the ground, one circle of unit tracks are uniformly distributed and arranged on the outer arc of the flexible chain ring, the unit tracks are in longitudinal point connection with the flexible chain ring, the unit tracks are laid on the outer arc of the flexible chain ring and are used for dispersing the stress of an obstacle to the supporting wheels and play a role of dispersing and transmitting the ground stress to a plurality of supporting wheels above the unit tracks, and the length of each unit track is preferably set in such a way that two or more supporting wheels can be longitudinally or obliquely arranged and held above each unit track. More than two supporting wheels are always simultaneously held in the longitudinal or oblique direction of each unit track and jointly act on the unit track, so as to achieve the goals of longitudinally stabilizing the unit tracks and preventing the unit tracks from warping and jolting forwards and rearwards. The supporting wheels roll on the flexible chain ring, the unit tracks are in longitudinal point connection with the flexible chain ring, thus the two end parts of the unit tracks can be warped and separated from the flexible chain ring during large-curvature revolution along with the flexible chain ring, and the change of winding stress curing large-curvature revolution is reduced. When a flexible rubber body is used, as the flexible chain ring and is laid between the unit tracks and the supporting wheels, the flexible rubber body shall be made of fiber composite materials having a good as far as possible traction resisting effect. In order to reduce rolling resistance caused by depression during rolling of the supporting wheels on the flexible chain ring and reduce the winding stress of the flexible chain ring, the flexible chain ring shall be thinned as much as possible to reduce the depression depth of the supporting wheels. Moreover, a plurality of rows of supporting wheel sets are transversely abreast distributed on the axle housings, the supporting wheels are longitudinally distributed in a staggered manner, the projections of the side surfaces are intersected, more than one equal dividing line is arranged in the span of two longitudinal supporting wheels. For example, when four equal dividing lines are arranged, the supporting wheels aside are respectively installed on two dividing lines on the left and right, and the supporting wheels aside which are arranged in spaced rows on the left and right are installed on a third equal dividing line and a fourth equal dividing so as to achieve the goals of shortening the longitudinal distance between each pair of transverse adjacent supporting wheels, arranging more supporting wheels in a smaller area, installing more supporting wheels as possible above each unit track, reducing the pressure applied by the supporting wheels onto the flexible chain ring and dispersing the stress from the ground onto as many supporting wheels as possible. For the setting of the length of each unit track, it should be considered that at least two or more supporting wheels are longitudinally or obliquely arranged as many as possible, and the warping and separating height of the unit tracks during large-curvature revolution. When a rigid chain is used as the flexible chain ring, in addition to that as many supporting wheels as possible are arranged above each unit track, it should be considered, when setting the length of each unit track, that the length of the unit track preferably covers as many chain links as possible, and the warping and separating height of the unit track during large-curvature revolution should also be considered, so as to control the warping and separating height of the unit track during large-curvature revolution within a comparatively proper range. If track protection wheels are arranged at the positions of large-curvature revolution at the front part and the rear part, the length of each unit track shall be set in a way that the warping and separating height of the two end parts of the unit track does not exceed the edges of the wheel arcs of the track protection wheels during large-curvature revolution. The unit track can be formed as fully rubber body and can also be formed as a rubber body with a rigid unit track base plate. Hardness of fully rubber unit tracks shall preferably guarantee that the stress from the ground can be better dispersed onto the supporting wheels. If the hardness of fully rubber unit tracks cannot well meet the demand of well dispersing the stress onto the supporting wheels from the ground, rigid materials can be adopted for making unit track base plates, so as to integrate the rigid unit track base plates and flexible unit track tire strips to form composite unit tracks. The rigid materials can be plastic or metal. Generally, the unit tracks are laid and serially connected outside the flexible chain ring, with the supporting wheels rolling on the flexible chain ring. A side of the unit tracks towards the supporting wheels can be set to have fixed curvature in the longitudinal direction, and the curvature of the unit tracks shall be equal to or smaller than the minimum curvature of the longitudinal arrangement and distribution of supporting wheel sets which are fixed on the axle housings. The longitudinal arrangement curvature of the supporting wheels on the axle housings can be kept consistent and can also be as smaller as possible at the middle part and be gradually increased at the front and rear ends. Besides, two axle housings can also be symmetrically arched and fit to form a longitudinally symmetrical shape such as a rugby-shaped caterpillar track wheel or a bullet-head-shaped caterpillar track wheel, so that the unit tracks with curvature which is equal to the minimum curvature of the axle housings stably revolve in close contact with the supporting wheels and the track supporting wheels on the axle housings. The unit tracks are located between the obstacle and the supporting wheels, the unit tracks are kept to be in a rigidly straight trend, and thus the stress of the obstacle to the supporting wheels is dispersed and transmitted to more supporting wheels through the unit tracks with certain hardness. When passing a vertical wall obstacle is, a common caterpillar track firstly semi-encloses the obstacle and the rear supporting wheels sequentially repeat surpassing and repetitively do work. Contrarily, just like a wheel, the caterpillar track wheel can climb over the obstacle in one time, do work in one time and get across the obstacle as a whole body, thus reducing the power consumption. Since the unit tracks are in longitudinal point connection with the flexible chain ring, during large-curvature revolution, the two end parts of the unit tracks can be warped and separated from the flexible chain ring, and the stress change of the flexible chain ring during large-curvature revolution is reduced. The embodiment has the effects that not only can the caterpillar track be thickened to disperse the longitudinal stress of the obstacle to the supporting wheels, but also the increasement of the winding stress of the caterpillar track can be restricted. The tension change of the caterpillar track while revolving or passing the vertical wall obstacle can be effectively reduced and eliminated, and both the demand for flexibility of the caterpillar track during large-curvature revolution and the demand for rigidity of the caterpillar track passing the vertical wall obstacle can be simultaneously and reasonably met without causing contradiction.

Embodiment 2

A method of buffering prestress in unit tracks of a caterpillar track wheel with division of work between track and chain is provided. The caterpillar track wheel with division of work between track and chain comprises a flexible chain ring and unit tracks, a set of unit tracks are uniformly distributed and arranged on the outer arc of the flexible chain ring, the unit tracks are in longitudinal point connection with the flexible chain ring, each unit track comprises a front part and a rear part along the running direction of the caterpillar track wheel delimited by a connecting point at which the unit track is connected with the flexible chain ring longitudinally, the position of the connecting point on each unit track connected with the flexible chain ring longitudinally is adjusted to have the length of the rear part of each unit track to be greater than that of the corresponding front part, so that by means of the movement inertial force of each unit track and the centrifugal force obtained during large-curvature revolution and by taking the connecting point of each unit track and the flexible chain ring as a supporting point, the inertial force and centrifugal force which are obtained by the rear part of each unit track and are greater than those of the front part of the unit track due to elongation are converted into prestress capable of prying the front part of each unit track to get close to the flexible chain ring, thereby making the rear part the unit track apply prestress capable of enabling the front end part of the unit track to get close to the flexible chain ring in advance to the front end part of the unit track during large-curvature revolution of the rear part of each unit track, and thus facilitating lessening of the fulminant impact caused by the front part of each unit track to the flexible chain ring at the end of revolution.

The unit track front part and rear part as mentioned in this description is divided along the regular advancing direction of the caterpillar track wheel by taking the position of the connecting point of each unit track connected with the flexible chain ring longitudinally as the dividing point. The rear part of each unit track behind the corresponding dividing point is generally set to be longer and is called as the unit track rear part in the description. The front part of each unit track in front of the corresponding dividing point is generally set to be shorter and is called as the unit track front part in the description. The position of each longitudinal connecting point on the corresponding unit track connected with the flexible chain ring shall be set according to the comprehensive calculation and evaluation of factors such as mass, regular speed, regular advancing direction, inertial force, centrifugal force, length and maximum curvature of needed revolution of the unit track during application. Generally and preferably, the front part of each unit track can obtain prestress capable of minimizing the impact to the flexible chain ring at the end of large-curvature revolution during large-curvature revolution of the unit track at regular speed. Therefore, the connecting position of each unit track and the flexible chain ring needs to be adjusted to a proper connecting position towards the front part of the unit track. The connecting position can be obtained through comprehensive calculation or full-scale testing, so that the moving mass of the rear part of the unit track behind the connecting position on the unit track connected with the flexible chain ring is greater than that of the front part of the unit track due to that the length of the rear part of the unit track is relatively greater than the length of the front part of the unit track. Therefore, during large-curvature revolution, the rear part of each unit track can obtain a centrifugal force and inertial force greater than those of the front part of the unit track, thereby achieving the goal of continuously prying the front part of the unit track to get close to the flexible chain ring, and thus the goals of relieving the unit track impact, decreasing the power consumption of the caterpillar track and reducing the running noise are achieved. The position of the serial connecting point of each unit track and the flexible chain ring is shown as a front-back asymmetrical connection on the unit track. By using the front-back asymmetry of the position of the connecting point of each unit track, the rear part of the unit track produces centrifugal force and inertia force greater than those of the front part of the unit track during a large-curvature revolution of the unit track along with the flexible chain ring, the rear part of the unit track applies prestress to the front part of the unit track by using the differences in the centrifugal force and the inertial force, thus the rear part of the unit track pries the front part of the unit track in advance to get close to the flexible chain ring, and the goal of reducing the fulminant impact caused by the unit track to the flexible chain ring at the end of revolution is achieved. The serial connecting position on each unit track connected with the flexible chain ring shall be set according to a comprehensive evaluation and calculation or full-scale testing of factors such as regular speed, mass, inertial force, centrifugal force, length, revolving radius and magnitude of needed prestress during use of different caterpillar tracks, so as to achieve the goal of obtaining the prestress capable of minimizing the impact of the unit tracks to the flexible chain ring during large-curvature revolution of the caterpillar tracks at regular speed.

Embodiment 3

A method is provided for fitting unit tracks to a flexible chain ring of a caterpillar track wheel with division of work between track and chain. The caterpillar track wheel with division of work between track and chain comprises the flexible chain ring and the unit tracks, raised tenons are arranged on the flexible chain ring, and depressed mortises are arranged on the unit tracks and are fit with the raised tenons on the flexible chain ring.

The tenons and the mortises can be in a columnar shape like "1" and can also be in a horizontal in-line shape, an upward arrow shape, an inverted triangle wedge shape, a T shape, an inverted L shape, a Y-shaped or other shapes which are larger at the upper part and smaller at the lower part and are suitable for tractive fixation and fitting. Rigid tenon beams are embedded in the tenons, one or more than one unit track screw hole which penetrates through each unit track is formed in the mortise of the unit track, and screws penetrate through the unit track screw holes to fixedly connect the unit tracks onto the rigid tenon beams embedded in the tenons of the flexible chain ring in an assistant manner. In addition to the connecting method by using the above mentioned assistant fastening screws, the tenons and the mortises can be fastened and connected in an assistant way by using methods such as gluing and hot pressing. Outwards convex racks which are arranged in high density can be arranged on the outer arc surface of the flexible chain ring, and any rack can act as a tenon. Inwards concave tooth grooves which are formed in density equal to the density of the outwards convex racks on the flexible chain ring are formed in the unit tracks, and any inwards concave tooth groove can act as a mortise to be fit and connected with the tenon on the flexible chain ring. When the caterpillar track runs integrally, the outwards convex racks and the inwards concave tooth grooves are engaged with each other and do not interfere with each other.

Embodiment 4

A caterpillar track wheel with division of work between track and chain using rigid axle housings and staggered supporting wheels is provided. One circle of unit tracks are uniformly distributed and arranged on the outer arc of a flexible chain ring, the unit tracks are in point connection with the flexible chain ring longitudinally, the unit tracks have certain hardness, and the unit tracks are laid on the outer arc of the flexible chain ring, are used for dispersing the stress to the supporting wheels from an obstacle and play a role of dispersing the ground stress onto more supporting wheels as possible through intermediate unit tracks and the flexible chain ring.

The caterpillar track wheel with division of work between track and chain is formed like a triangular from a side view. Axle housings are installed in three sides of a caterpillar track to play a role of fixing the supporting wheels or track supporting wheels which are longitudinally distributed. The axle housings mentioned here also comprise supporting racks for installing the track supporting wheels. The minimum curvature of each of the axle housings on the three sides is set to be equal, and the longitudinal curvature of certain sides, towards the supporting wheels, of the unit tracks shall be equal to or smaller than the minimum curvature of the axle housings, so as to guarantee the arching curvature formed during contact fitting between the end surfaces of the adjacent unit tracks not greater than the minimum curvature of longitudinal distribution of the supporting wheels on the axle housings and to prevent the unit tracks from being separated from the supporting wheels on the axle housings. The supporting wheels can also be longitudinally distributed according to continuously changing curvature which is larger at the front and rear ends and smaller at the middle part. The longitudinal curvature of the unit tracks shall be equal to or smaller than the minimum curvature of longitudinal distribution of the supporting wheels. Two or more rows of supporting wheels are transversely arranged on the flexible chain ring, abreast supporting wheels are arranged in a longitudinally staggered manner, and the projections of their side surfaces are intersected, so as to shorten the span between adjacent supporting wheels and to achieve the goals of arranging as many supporting wheels as possible above one unit track and dispersing the stress onto the supporting wheels from the ground. Protruded wedge-shaped tenons are arranged on the flexible chain ring, depressed wedge-shaped mortises are arranged on the unit tracks and are fit with the protruded wedge-shaped tenons on the flexible chain ring, the longitudinal curvature of the unit tracks tallies with the longitudinal distribution curvature of the supporting wheels, the side view sidelines of adjacent front and rear ends of the unit tracks are superposed and tally with equal-angle dividing lines which radiate from a virtual circle center of the minimum distribution curvature of the supporting wheels. Sides of adjacent unit tracks towards the ground are seamlessly arranged at the position of the minimum curvature of the axle housings to form an integral form with respect to the ground. The side view shape of the unit tracks can be set to be prismatic, rectangular or mutually overlapped S-shaped. However, it should be noted that the unit tracks tally with each other when the unit tracks run to the position of the minimum distribution curvature of the supporting wheels, and the unit tracks do not interfere with each other when the unit tracks run to the position of the maximum distribution curvature of the supporting wheels and need to be warped up. The unit tracks serially connected by the flexible chain ring and the minimum distribution curvature of the supporting wheels have a common theoretical circle center, the unit tracks are arranged along the arc surface of the axle housings in a sector equal-angle dividing manner, and the gap between adjacent unit tracks is minimized, so that the outer arc surface of the unit tracks of the caterpillar track wheel with division of work between track and chain at running forms a seamless integral body with a tight structure with respect to the ground to prevent insertion of sharp and fine obstacles. By adopting a track-chain structure that load bearing and transmission are separated, the thickness of the caterpillar track is not limited by the winding motion any longer, the phenomenon of contradiction between the unit tracks does not occur any longer, and thus a multilayer composite explosion-proof and anti-armor-piercing caterpillar track can be produced. In order to prevent large foreign matters from falling inside, supporting plates on the two sides of the axle housings can be elongated by adopting the rigid structure of the axle housings to act as sealing mud guards, or flexible baffles can be additionally installed on the two sides of the axle housings at positions close to the flexible chain ring.

Embodiment 5

A method of opening and closing axle housing is adopted to divide each axle housing into an upper part and a lower part from the position of an axle hole. Each lower axle housing adopts transverse beams to integrally connect longitudinal beams of the axle housing at the top or in the gap of supporting wheels. Each lower axle housing can be non-integral and can solely seal connecting plates or axle hoops of each upper axle housing axle hole as long as the axles of the supporting wheels are sealed in the axle holes of the upper axle housings, at which situation the axles at the front and rear ends of the upper axle housings are connected with supporting racks. Each lower axle housing can also be manufactured as an integral body. Each lower axle housing adopts a transverse beam to fixedly connect the longitudinal beam of the corresponding axle housing in the gap of the supporting wheels to form an integral body, the transverse beams of the axle housings can be convex, the top of each convex transverse beam is embedded between two longitudinal beams to fix the abreast relative positions of the two longitudinal beams, and the transverse beams are fastened to the longitudinal beams with screws. The transverse beams and the longitudinal beams can also be set to be integral. The axle hole of each axle housing can be shaped as a circular, a square, a hexagon, a triangular or a polygon which is fit with the axles, or other shapes which are suitable for fitting and fixing the axles. For example, when square axles are adopted, each upper axle housing's axle hole can be in a square shape which is fit with the corresponding axle, and the contact position of each lower axle housing and the corresponding axle can be in a smooth structure without concave and convex parts. Contrarily, each lower axle housing can also be in a convex embedding structure which is fit with the groove of the corresponding upper axle housing, or an arching structure which uses an identical groove to jointly enclose the corresponding axle. For another example, when triangular axles are adopted, the axle hole of each upper axle housing can be in a square shape, the axle hole of the corresponding lower axle housing can be in a convex shape to enable the corresponding upper axle housing axle to be embedded in. The top of each convex shape is provided with an open-top inverted triangle to fit with the corresponding triangular axle, the triangular axles are installed on the inverted triangles, the convex part of each lower axle housing is embedded into the groove of the corresponding upper axle housing to form a closed triangle, and thus the triangular axles are fixed in a fit manner. As another example, when polygonal axles are adopted, the axle hole of each upper axle housing can be in a polygonal shape which is fit with the corresponding axle, and the contact position between the corresponding lower axle housing and the corresponding axle can be in a shape with a concave part to jointly fix the axles of the supporting wheels. On the side surfaces of each upper axle housing and the corresponding lower axle housing, a concave hoop is adopted for fixing the upper axle housing and the lower axle housing, the top of each upper axle housing and the bottom of the corresponding lower axle housing are embedded into the groove of the concave hoop, each groove can be optionally set to be an inclined groove which is larger at the opening and is smaller at the bottom, at least one inner side of each groove is set to be an inclined side to form an axle housing hoop, each axle housing hoop being fastened on the side surfaces of the corresponding upper axle housing and the corresponding lower axle housing in a contact way. Screws are used for continuously tightening the axle housing hoops towards the side surfaces of the axle housings. Each upper axle housing and the corresponding lower axle housing are continuously squeezed into a horn-shaped groove, which continuously becomes small, of the corresponding axle housing hoop, and are squeezed, fit and fixed together by the corresponding axle housing hoop when or before the upper axle housing and the lower axle housing reach the bottom of the groove of the corresponding axle housing hoop. Moreover, the cross sections of the upper and lower sides of each upper axle housing and the corresponding lower axle housing can be set to be in a cone shape towards the two sides, the groove of the corresponding axle housing hoop is set to be a square groove, the cross sections of the upper and lower surfaces of certain sides, in contact with the corresponding axle housing hoop, of the upper axle housing and the lower axle housing are set to be in a cone shape. The conical cross section formed by each upper axle housing and the corresponding lower axle housing are continuously squeezed into the square groove of the corresponding axle housing hoop, and each conical cross section relatively and continuously becomes larger. The upper axle housings and the lower axle housings get close to each other under the squeezing, and thus the goal of fixing the axles of the supporting wheels is achieved. To sum up, the goal of tightly fixing each upper axle housing and the corresponding lower axle housing can be achieved as long as the corresponding groove relatively and continuously becomes larger when the upper axle housing and the lower axle housing are contained in the groove of the corresponding axle housing hoop, thus the cross sections of each upper axle housing and the corresponding lower axle housing can be optionally in a cone shape and the groove of the corresponding axle housing hoop can be optionally in a horn shape with a large opening. In order to disperse the pressure of the axle housing hoops, when axle housing hoops with smaller length along the longitudinal direction of the axle housings are adopted, axle housing hoops should be longitudinally and abreast distributed as many as possible along the side surfaces of the axle housings. In order to disperse the stress to the utmost extent, each axle housing hoop is generally manufactured as a fitting and fastening integral body with length which is close to the length of the corresponding upper axle lousing and the corresponding lower axle housing as much as possible. If the supporting racks of the caterpillar track wheel are connected onto the front and rear ends of the lower axle housings, when the axle housing hoops are removed, any supporting wheel can be conveniently placed and picked out by uncovering the corresponding upper axle housing only. If the supporting racks of the caterpillar track wheel are connected onto the front and rear ends of the upper axle housings, when the axle housing hoops are removed, the caterpillar track needs to be disassembled firstly and then the lower axle housings are outwards uncovered. Under the situation that the load is small and the requirement on stress dispersion is not high, a structure that each upper axle housing and the corresponding lower axle housing are fixed together directly by using cotter pins or screws can also be adopted; even a manner of directly fixing the axles in the axle holes of the upper axle housings or the lower axle housings by using connecting plates and screws can be adopted, i.e., only one upper axle housing or lower axle housing is adopted, then the axle of the corresponding supporting wheel is installed in the axle hole with an open side, and finally the corresponding connecting plate or axle housing hoop is used for locking the axle in the axle hole.

According to the above-mentioned embodiments, the present invention has the following features:

The unit tracks are laid on the outer arc of the flexible chain ring and are in point connection with the flexible chain ring in the longitudinal direction, the length of each unit track is set in such a way that at least two or more longitudinally or obliquely arranged supporting wheels can be simultaneously held above each unit track, the supporting wheels are installed on the axle housings and are arranged according to certain longitudinal distribution curvature, and the longitudinal curvature of the unit tracks is equal to or smaller than the longitudinal distribution curvature of the supporting wheels arranged on the axle housings.

A plurality of unit tracks are uniformly distributed as a circle or the outer arc of the flexible chain ring, the unit tracks are in point connection with the flexible chain ring longitudinally, each unit track comprises a front part and a rear part with the position of a longitudinal connecting point of each unit track connected with the flexible chain ring as a dividing point, tie position of the longitudinal connecting point on each unit track connected with the flexible chain ring is adjusted to enable the length of the rear part of the position of the connecting point of each unit track to be greater than the length of its front part, the inertial force and centrifugal force which are obtained by the rear part of each unit track due to elongation and are greater than those of the front part of each unit track are converted into prestress capable of prying the front part of each unit track to get close to the flexible chain ring by using the movement inertial force of each unit track and the centrifugal force obtained during large-curvature revolution and by taking the connecting point of each unit track with the flexible chain ring as a supporting point, the rear part of each unit track applies prestress capable of enabling the front end part of each unit track to get close to the flexible chain ring in advance to the front end part of each unit track during large-curvature revolution of the rear part of the unit track, and thus the fulminant impact caused by each unit track to the flexible chain ring at the end of revolution is reduced.

Protruded tenons are arranged on the flexible chain ring, and depressed mortises are arranged on the unit tracks and are fit with the protruded tenon on the flexible chain ring.

Each axle housing is longitudinally divided into an upper axle housing and a lower axle housing from the position of axle holes, the upper axle housings and the lower axle housings are fixedly hooped together through mechanical parts to jointly form the axle holes, and axles of supporting wheels are installed in the axle holes.

Groove-shaped axle housing hoops are arranged on the side surfaces of each upper axle housing and the corresponding lower axle housing. The upper axle housings and the lower axle housings are squeezed into grooves, which continuously and relatively become smaller, of the groove-shaped axle housing hoops by tightening screws for connecting the upper axle housings or the lower axle housings on the side surfaces of the groove-shaped axle housing hoops, and thus the upper axle housings and the lower axle housings are hooped, squeezed and fixed together.

Axle housing transverse beams are arrange between axle housing longitudinal beams of the upper axle housings or of the lower axle housings, and the axle housing transverse beams penetrate through gaps between longitudinal adjacent supporting wheels to integrally connect and fix the abreast longitudinal axle housing longitudinal beams.

A plurality of rows of supporting wheels are abreast arranged on the axle housings in a longitudinally staggered manner through independent axles, two or more equal dividing lines are arranged in the span of axes of two longitudinal supporting wheels, adjacent transverse supporting wheels on the left and right are respectively arranged on the equal dividing lines, and more than three adjacent supporting wheels are obliquely arranged, so as to achieve the goals of infinitely reducing the longitudinal span between adjacent supporting wheels, increasing the number of corresponding supporting wheels on one single unit track and effectively dispersing the stress from the ground onto more supporting wheels as possible through the unit tracks.

The flexible chain ring is a rigid chain and the rigid chain is connected with base plates of the unit tracks through track threading link plates.

The curvature of the unit tracks takes a virtual circle center of the minimum distribution curvature of the supporting wheels as a center, the inner arc and the outer arc of the unit tracks in a side view are divided in an equal-angle manner by equal-angle dividing lines which radiate from the virtual circle center to form the length of the unit tracks, an the sidelines at the front and rear ends of the unit tracks are theoretically superposed and fit with the equal-angle dividing lines which radiate from the virtual circle center.

The axles of the supporting wheels are tightly fixed in the axle holes of the upper axle housings through connecting plates and screws or directly by using axle hoops.

At least one groove-shaped axle housing hoop is arranged on the side surfaces of each upper axle housing and the corresponding lower axle housing. Each upper axle housing and the corresponding lower axle housing are squeezed into a groove, which continuously becomes relatively smaller, of the groove-shaped axle housing hoop by tightening axle housing connecting screws for connecting the corresponding upper axle housing or the corresponding lower axle housing on the side surface of corresponding the groove-shaped axle housing hoop, and thus the upper axle housings and the lower axle housings are hooped, squeezed and fixed together.

Rigid unit track base plates are arranged on certain sides, towards the supporting wheels, of the unit tracks.

The tenons and the mortises are preferably in a shape which has a bigger upper part and smaller lower part and is suitable for tractive fixation and fitting.

Track protection wheels for protecting the unit tracks are arranged at the front and rear ends of the caterpillar track wheel.

Rigid tenon beams are embedded in the tenons, one or more unit track screw hole which penetrates through each unit track is formed in the mortise of the unit track, and screws penetrate through the unit track screw holes to fixedly connect the unit tracks onto the rigid tenon beams embedded in the tenons of the flexible chain ring in an assistant manner.

The caterpillar track wheel with division of work between track and chain is triangular in side view, and the distribution curvature of the track supporting wheels arranged on the front and rear sides of the triangle is equal to the minimum distribution curvature of the supporting wheels on the axle housings.

The axles of the supporting wheels are tightly fixed in the axle holes of the upper axle housings through connecting plates and screws or directly by using axle hoops.

At least one groove-shaped axle housing hoop is arranged on the side surfaces of each upper axle housing and the corresponding lower axle housing. Each upper axle housing and the corresponding lower axle housing are squeezed into a groove, which continuously and becomes relatively smaller, of the groove-shaped axle housing hoop by tightening axle housing connecting screws for connecting the upper axle housing or the lower axle housing on the side surface of the groove-shaped axle housing hoop, and thus the upper axle housings and the lower axle housings are hooped, squeezed and fixed together.

The axle housings are symmetrically arched and fit together to form a vertically symmetrical shape such as a rugby-shaped caterpillar track wheel or a bullet-head-shaped caterpillar track wheel, so that the unit tracks with curvature which is equal to the minimum curvature of the axle housings stably revolve in close contact with the supporting wheels and the track supporting wheels on the axle housings.

BRIEF DESCRIPTION OF THE DRAWINGS

The present invention will be further described below in details in conjunction with specific examples and drawings, wherein.

Figure 1:
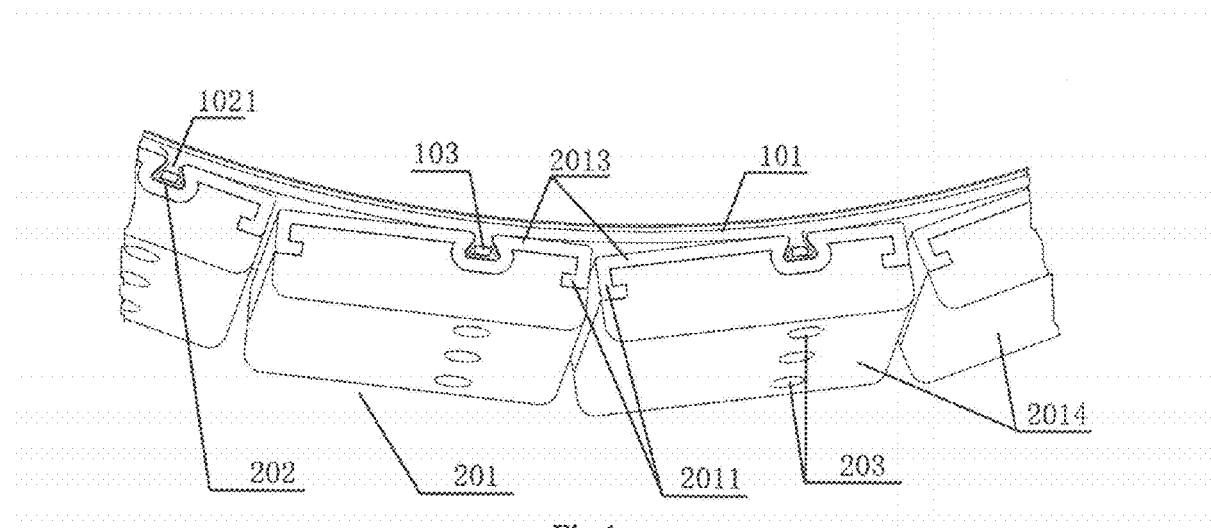
FIG. 1 is a schematic view of wedge-shaped fitting of unit tracks with a flexible chain ring of the present invention.

Major reference numerals on the drawings of the present invention are as follows:

101—flexible chain ring; 102—tenon; 1021—wedge-shaped tenon; 1022—T-shaped tenon; 103—tenon beam; 1031—tenon beam screw hole; 105—track threading link plate; 201—unit track; 202—mortise; 2021—wedge-shaped mortise; 2022—T-shaped mortise; 2011—unit track end edge cover; 2012—unit track side surface edge cover; 2013—unit track base plate; 2014—unit track tire strip; 203—unit track screw hole; 301—track supporting wheel; 302—adjusting groove; 303—supporting rack; 401—supporting wheel; 4011—toothed supporting wheel; 402—track guide wheel; 403—end track guide wheel; 404—track guide retaining edge; 4031—driving tooth; 4032—end track guide wheel grouser groove; 4034—driving tooth hole; 405—axle; 4051—axle bearing; 406—driving shaft; 407—driving wheel; 4071—driving wheel flange plate; 501—track protection wheel; 5011—track protection wheel tire; 601—axle housing; 6011—axle housing connecting hole; 6012—axle housing connecting screw; 6013—supporting rack connecting hole; 6015—axle housing connecting sleeve; 701—track shoe; 702—grouser; 7011—track shoe reinforcing rib; 801—upper axle housing; 8011—upper axle hole; 802—lower axle housing; 8021—lower axle hole; 803—axle housing hoop; 8031—axle hoop; 804—axle housing longitudinal beam; 805—axle housing transverse beam; 806—supporting wheel rolling hole; 808—axle housing rack.

Example 1

Figure 3:
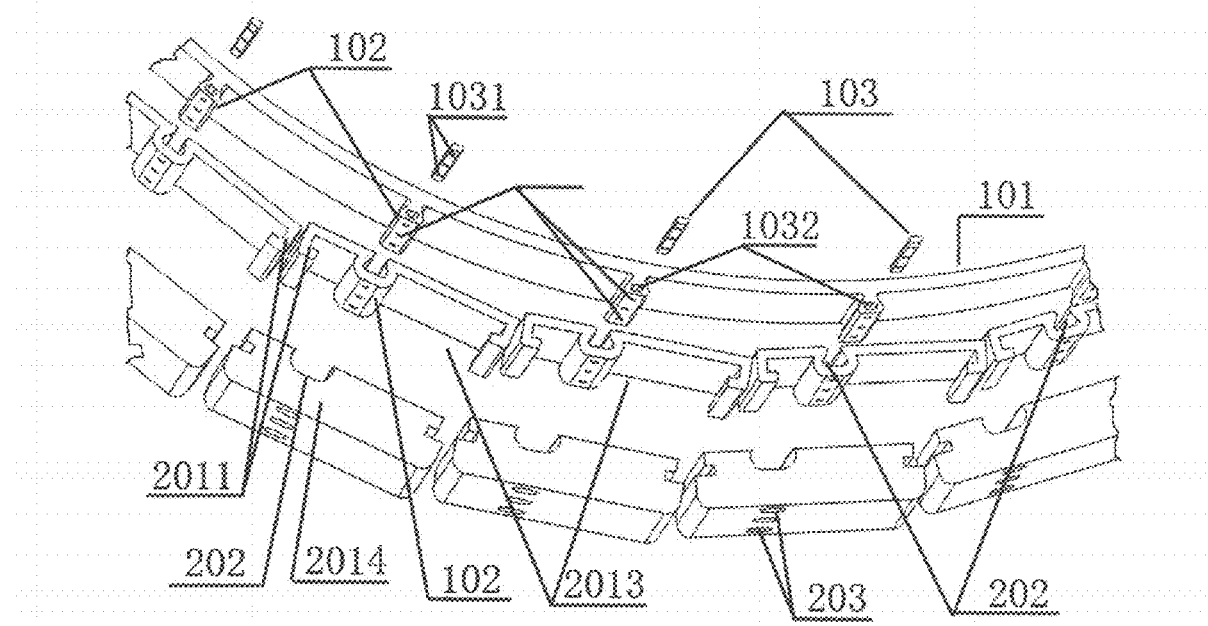
FIG. 3 is an exploded view of unit tracks and a flexible chain ring of the present invention.

As shown in FIG. 1 and FIG. 3, the example is a track-chain separated-type composite caterpillar track which adopts unit track and flexible chain ring wedge-shaped fitting, and tenons 102 are arranged on a flexible chain ring 101. The tenons 102 are wedge-shaped tenons 1021. Rigid tenon beams 103 are embedded in tenon beam holes 1032 of the wedge-shaped tenons 1021. A set of unit tracks 201 are longitudinally laid as a circle on the outer arc of the flexible chain ring 101, and mortises 202 are arranged on the unit tracks 201. The mortises 202 are wedge-shaped mortises 2021, the flexible chain ring 101 is longitudinally fit and connected with the wedge-shaped mortises 2021 on the unit tracks 201 through the wedge-shaped tenons 1021, thus the unit tracks 201 are fixed in a tractive manner and serially connected onto the flexible chain ring 101. Rigid unit track base plates 2013 and unit track tire strips 2014 are arranged on the unit tracks 201, and unit track end edge covers 2011 and the wedge-shaped mortises 2021 are arranged on the unit track base plates 2013. The protruded tenons 102 are set correspondingly against the back surfaces of the mortises 2021 and are fit with the mortises 202 on the unit track tire strips 2014 to assist fixing the unit track tire strips 2014 on the unit track case plates 2013. Unit track screw holes 203 in the unit tracks 201 are provided through the nut track tire strips 2014 and the unit track base plates 2013, through which screws penetrate to assist fixing the unit tracks 201 on the tenon beam screw holes 1031 of the tenon beams 103 of the flexible chain ring 101. The fitting point of tenon 102 and mortise 202 at which the unit tracks 201 serially connected with the flexible chain ring 101 is located at approximate one-third of the length in the longitudinal directions of the unit tracks 201. The rigid tenon beams 103 are embedded in the tenons 102, one or more unit track 201 screw holes which are provided through each unit track 201 are formed in the mortise 202 of the unit track 201, and screws penetrate through the unit track 201 screw holes to assist fixedly connecting the unit tracks 201 onto the rigid tenon beams 103 embedded in the tenons 102 of the flexible chain ring 101.

Example 2

Figure 2:
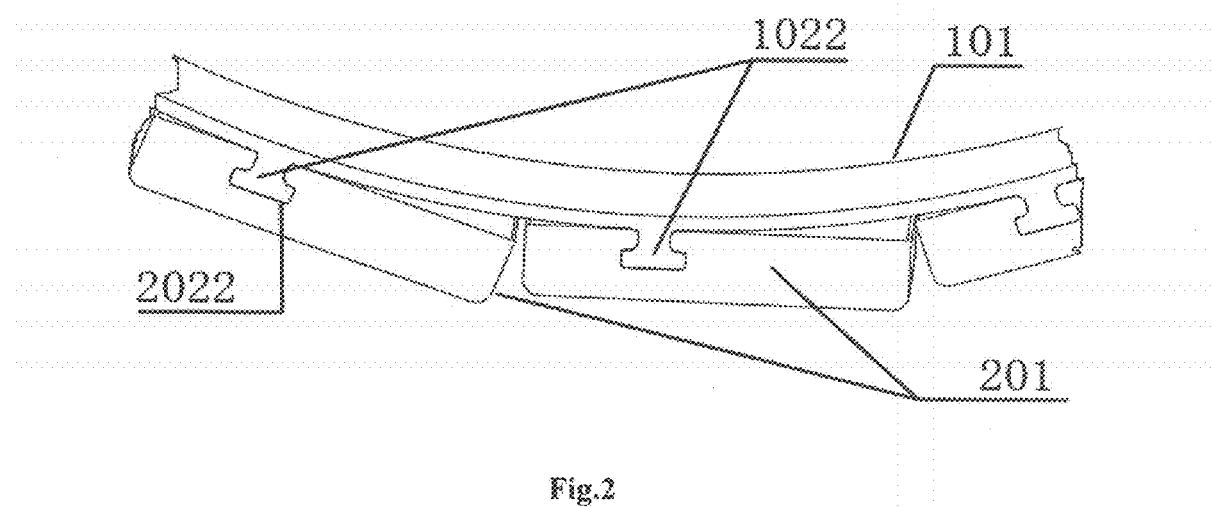
FIG. 2 is a schematic view of T-shaped fitting of unit tracks with a flexible chain ring of the present invention.

As shown in FIG. 2, the example is a track-chain separated-type composite caterpillar track which adopts unit track and flexible chain ring T-shaped fitting. A plurality of unit tracks 201 are longitudinally laid as a circle on the outer arc of a flexible chain ring 101. The flexible chain ring 101 is fit and connected with T-shaped mortises 2022 on the unit tracks 201 through T-shaped tenons 1022, and thus the unit tracks 201 are fixed in a tractive manner and serially connected onto the flexible chain ring 101. The fitting point of T-shaped tenon 1022 and T-shaped mortise 2022 on the unit tracks 201 at which the unit track 201 is serially connected with the flexible chain ring 101 is located at approximate one-third of the length in the longitudinal directions of the unit tracks 201. The T-shaped tenons 1022 and the T-shaped mortises 2022 on the unit tracks 201 are fit and fixed through assistance of gluing or hot pressing.

Example 3

Figure 4:
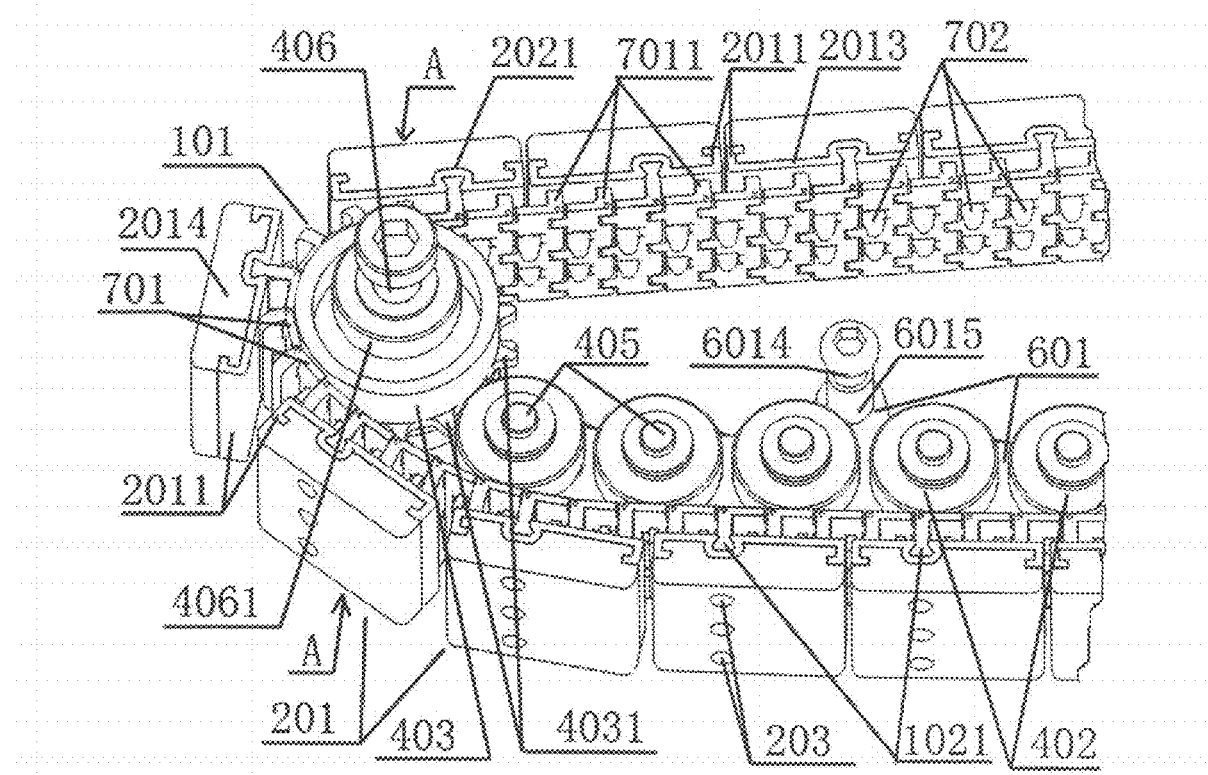
FIG. 4 is a local schematic view of a track-chain separated-type structure of the present invention applied to a traditional caterpillar track.
Figure 5:
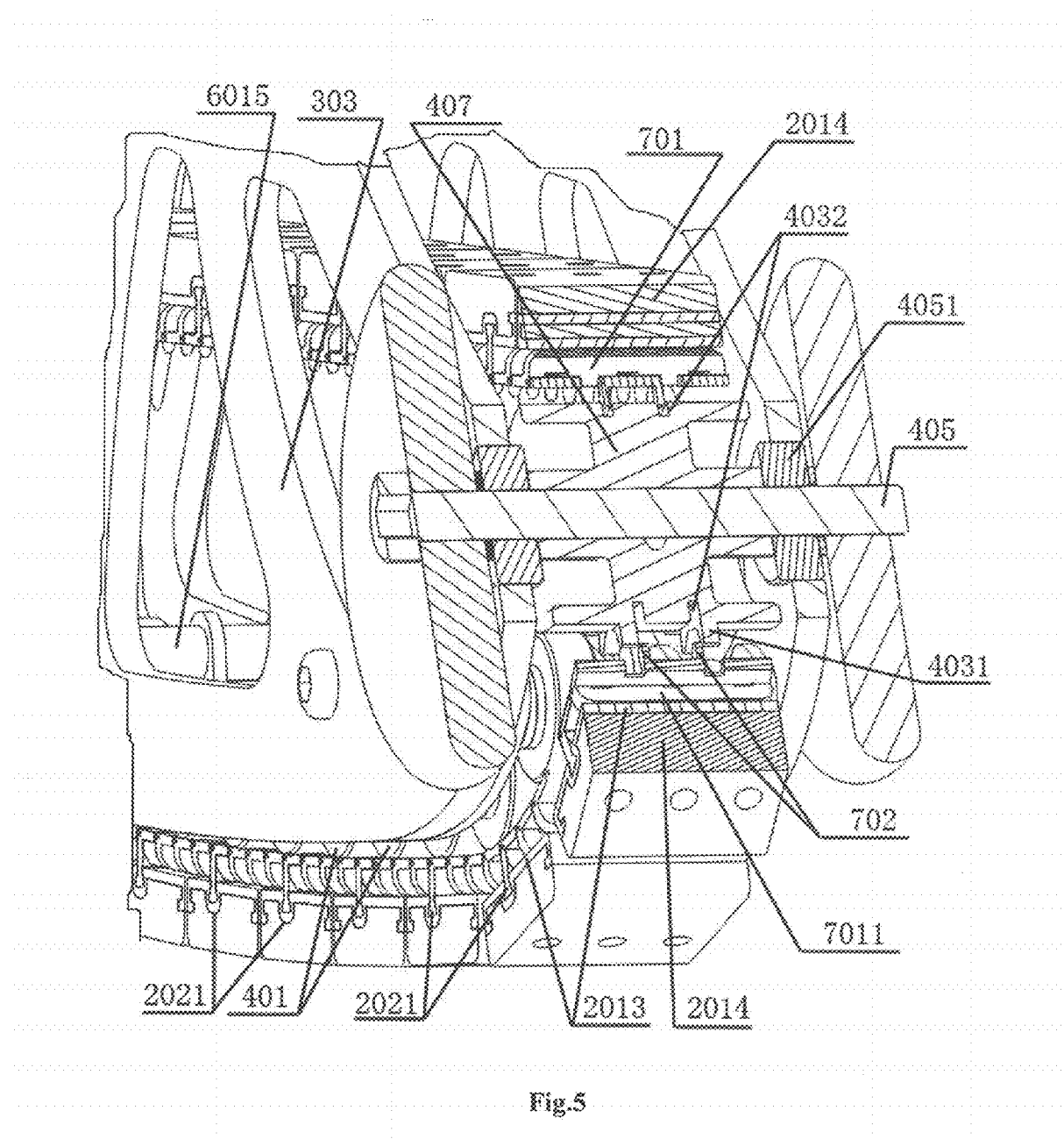
FIG. 5 is a sectional view along line A-A in FIG. 4.
Figure 6:
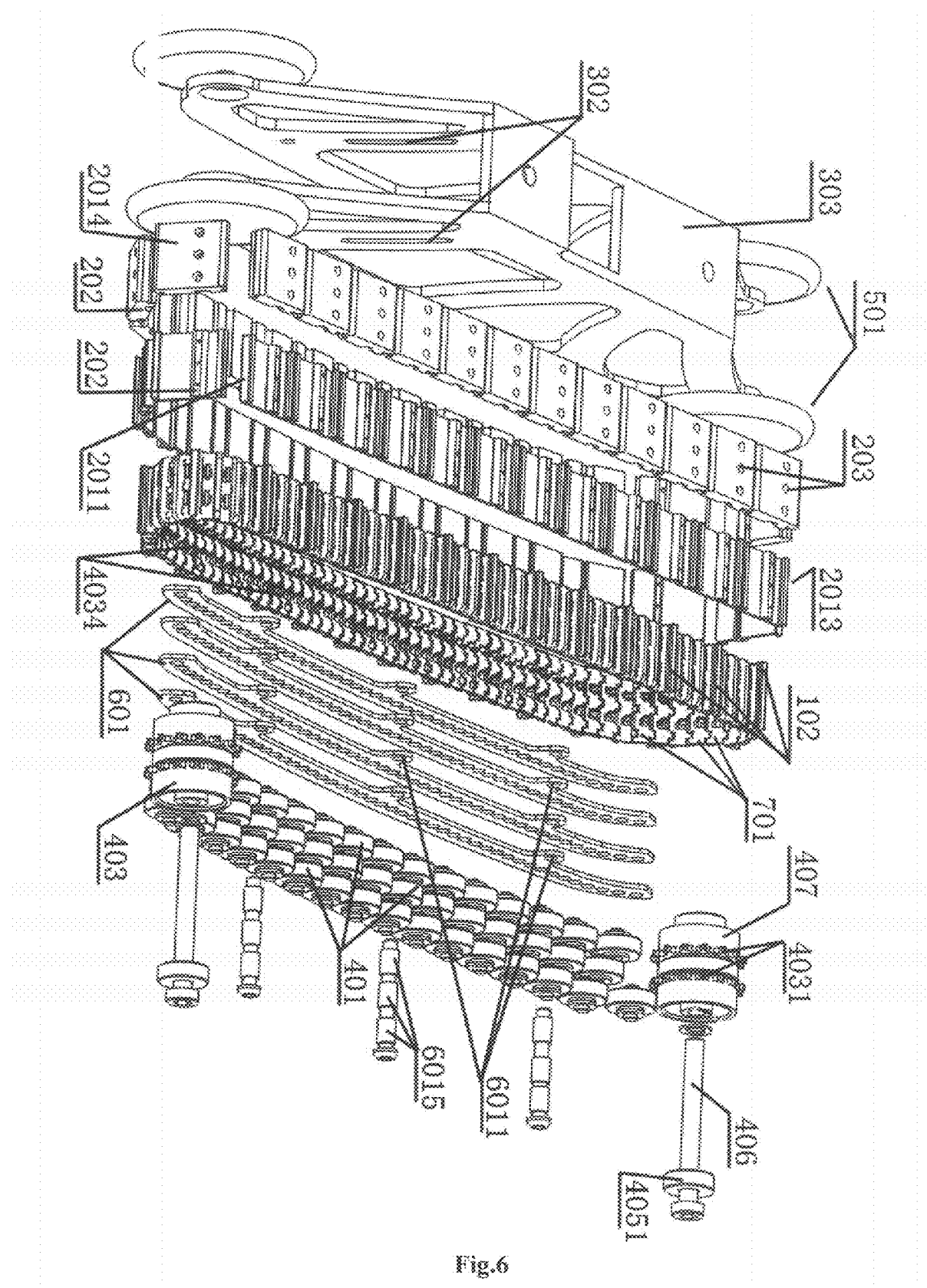
FIG. 6 is an exploded schematic view of a track-chain separated-type structure of the present invention applied to a traditional caterpillar track.

On the basis of referring to FIG. 1 and FIG. 2, as shown in FIG. 3 and FIG. 4, the example is application of a caterpillar track wheel with division of work between track and chain and a method for fitting unit track with flexible chain ring on a common caterpillar track, wherein the caterpillar track wheel with division of work between track and chain comprises a plurality of rows of supporting wheels 401 which are longitudinally staggered and abreast arranged, axle housings 601 which are used for placing the supporting wheels 401, axle housing connecting screws 6013 which are used for fixedly connecting the axle 601 and penetrate through axle housing connecting screw holes 6012 and axle housing connecting sleeves 6015 arranged between the axle housings 601 to tightly fix the axle housings 601 on supporting racks 303 on the two sides, track shoes 701 which cover the supporting wheels 401 to form the flexible chain ring 101, grousers 702, track shoe reinforcing ribs 7011 which are used for dispersing stress from the ground, wedge-shaped tenons 1021 which extend from the reinforcing ribs, track guide wheels 402 which play a supporting role, end track guide wheels 403, end track guide wheel grouser grooves 4032, unit tracks 201 which are used for dispersing the ground stress, unit track screw holes 203, wedge-shaped mortises 2012 which are fit with the wedge-shaped tenons 1021 extending from the track shoe reinforcing ribs, unit track base plates 2013 which are used for increasing the rigidity of the unit tracks 201, unit track tire strips 2014 which are used for dispersing the pressure of the stress, unit track end edge covers 2011 which are used for assisting hooping of the unit track tire strips 2014, a driving wheel 407, a driving shaft 406, a driving shaft bearing 4061, track protection wheels 501 which protect the unit tracks 201 to do warping and separating motion during revolution, axles 405 and axle bearings 4051.

The supporting wheels 401 are installed on the axle housings 601 along the longitudinal curvature; a plurality of rows of supporting wheels 401 are abreast arranger and are longitudinally staggered. The axle housing connecting sleeves 6015 are arranged between the axle housings 601 and are aligned with the axle housing connecting screw holes 6012. The axle housing connecting screws 6013 penetrate through the axle housing connecting screw holes 6012 to tightly fix the axle housings 601 on the supporting racks 303 on the two sides. The supporting wheels 401 are covered with the flexible chain ring 101. The flexible chain ring 101 comprises the track shoes 701 for dispersing stress from the ground, the grousers 702 for preventing side slipping and the track shoe reinforcing ribs 7011 for transversely dispersing stress from the ground and protecting driving teeth. The wedge-shaped tenons 1021 which extend from the track shoe reinforcing ribs 7011 are fit with the wedge-shaped mortises 2021 of the rigid unit track base plates 2013 on the unit tracks 201. The unit tracks 201 disperse stress from the ground to a plurality of supporting wheels 401 above the unit tracks 201 through ground touching tire strips and the rigid unit track base plates 2013. The track guide wheels 402 also play a role for supporting. The end track guide wheels 403 are arranged at the front and rear parts of a caterpillar track device and are fixedly connected onto the supporting racks 303 through the axles 405 and the axle bearings 4051. End track guide wheel grouser grooves 4032 are formed at the end track guide wheels 403 for allowing the grousers 702 to slide through during forward-backward winding and running of the caterpillar track so as to induce the caterpillar track to wind and run along the longitudinal direction. The driving wheel 407 on the other side of the caterpillar track functions like the end track guide wheel 403, on which the axle bearings 4051 and a driving shaft 406 connected with a power device are additionally provided. The driving wheel is inserted into caterpillar track tooth holes through driving teeth to drive the caterpillar track to wind and run. The wedge-shaped tenons 1021 which extend from the track shoe reinforcing ribs 7011 are fit and connected with the unit tracks 201 to longitudinally and serially connect the unit tracks 201 to form a ring. The unit track screw holes 203 which penetrate through the unit track tire strips 2014 and the unit track base plates 2013 are formed at the positions corresponding to the wedge-shaped tenons 1021, on the wedge-shaped grooves of the unit tracks 201. Screws are used for assisting to fix the unit tracks 201 on the wedge-shaped tenons 1021. The unit track end edge covers 2011 for assisting hooping of the unit track tire strips 2014 are arranged on the unit tracks 201. The track protection wheels 501 are arranged at the front and rear end parts of the caterpillar track; track protection wheel tires 5011 are arranged on the track protection wheels. The track protection wheels 501 protect the unit tracks 201 to conduct large-curvature revolution motion at the front and rear ends.

Example 4

Figure 7:
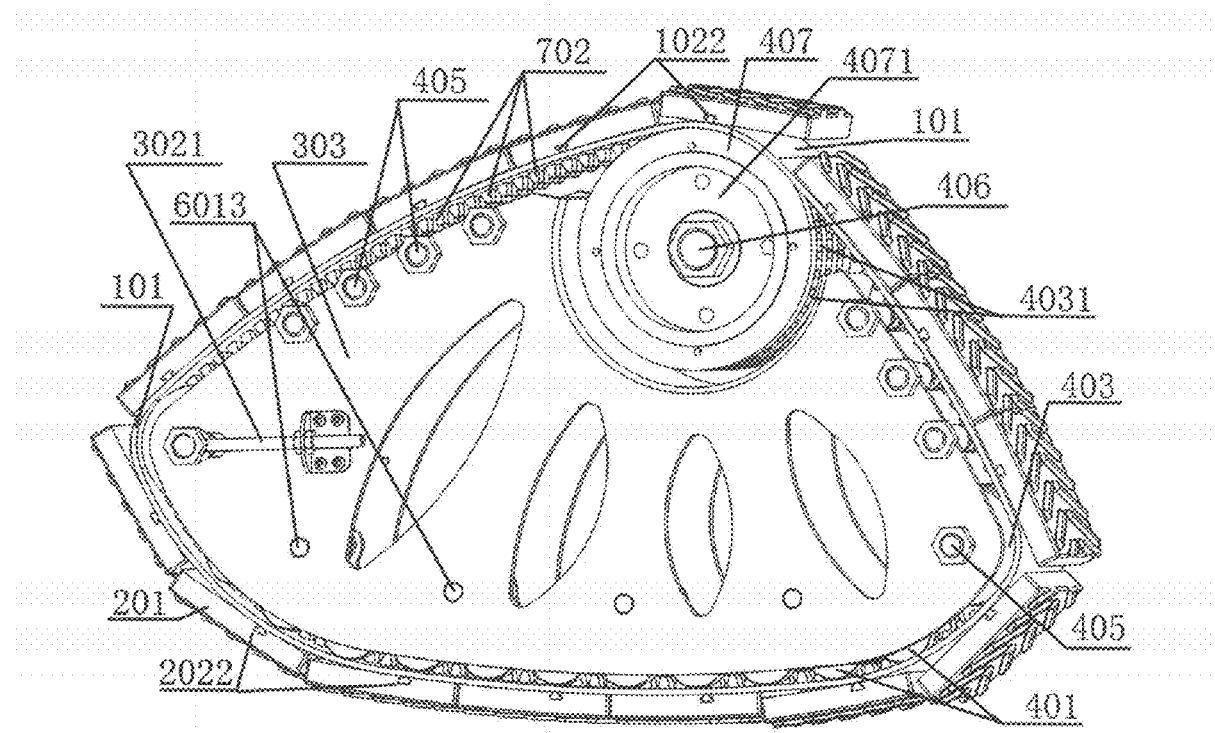
FIG. 7 is a side view of a caterpillar track wheel with division of work between track and chain, a method for fitting unit track with flexible chain ring and a method for buffering prestress according to the present invention applied to a triangular caterpillar track.
Figure 8:
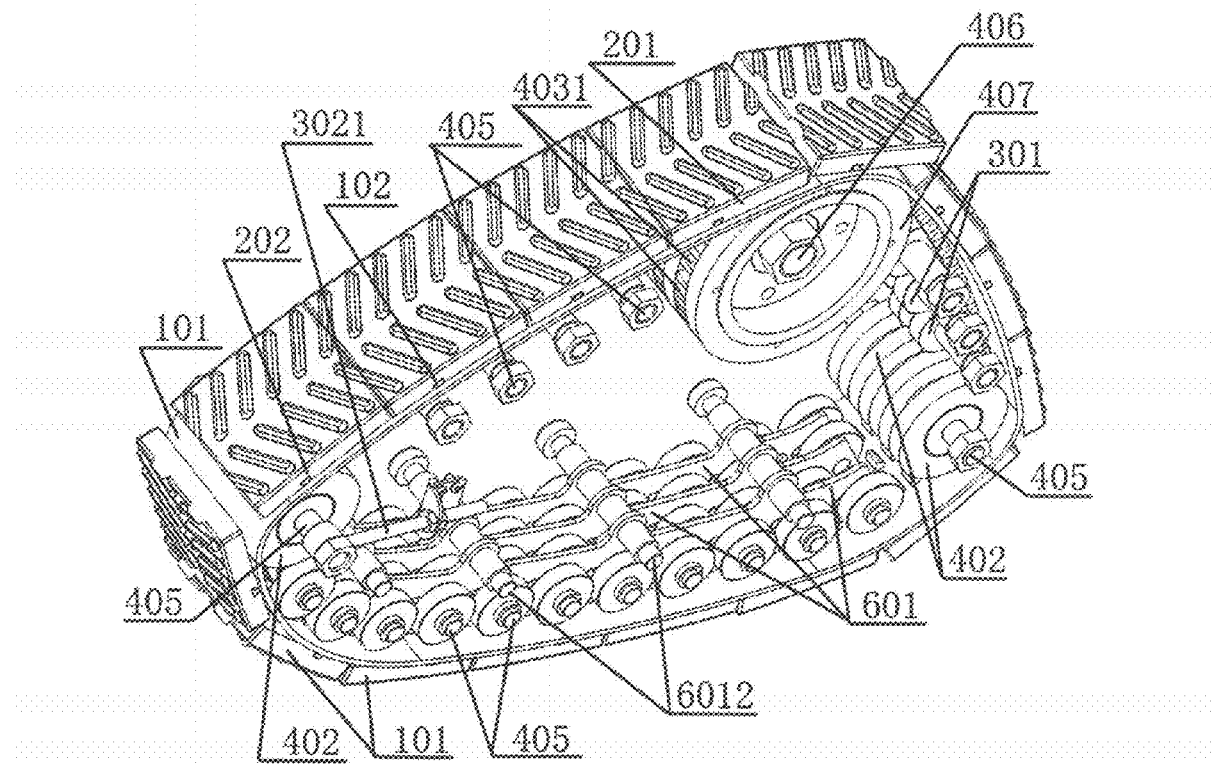
FIG. 8 is a local structural schematic view of caterpillar track wheel with division of work between track and chain, a method for fitting unit track with flexible chain ring and a method for buffering prestress according to the present invention applied to a triangular caterpillar track.
Figure 9:
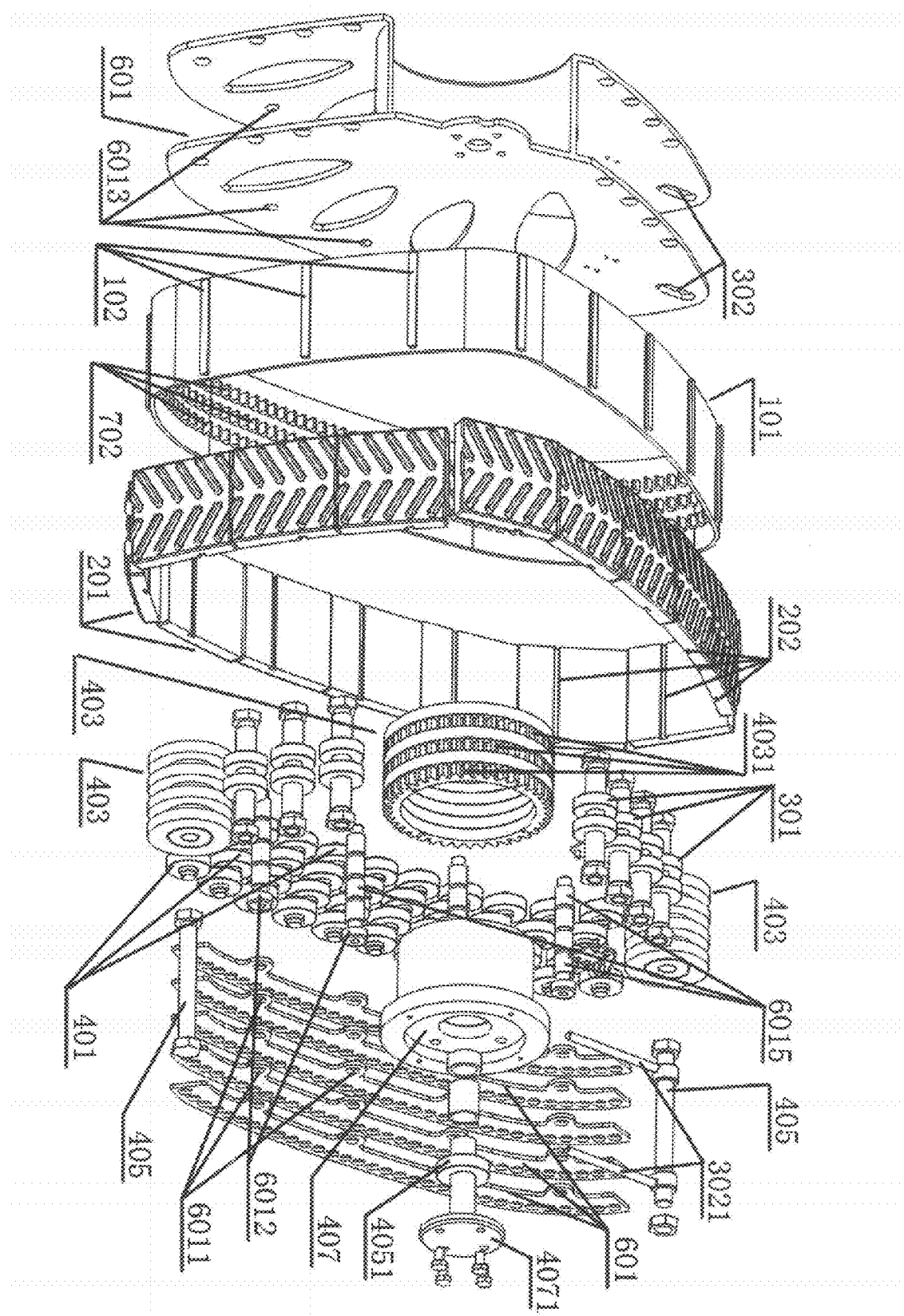
FIG. 9 is an integral exploded schematic view of a caterpillar track wheel with division of work between track and chain, a method for fitting unit track with flexible chain ring and a method for buffering prestress according to the present invention applied to a triangular caterpillar track.

On the basis of referring to FIG. 1, FIG. 2 and FIG. 3, as shown in FIG. 7, FIG. 8 and FIG. 9, the example is application of a caterpillar track wheel with division of work between track and chain, a method for fitting unit track with flexible chain ring fitting and a method for buffering pre-stress on a staggered supporting wheel type triangular caterpillar track assembly. The caterpillar track wheel with division of work between track and chain comprises a plurality of rows of supporting wheels 401 which are longitudinally staggered and abreast arranged, axle housings 601 which are used for placing the supporting wheels 401, axle housing connecting screws 6013 which are used for fixedly connecting the axle housings 601 and penetrate through axle housing connecting screw holes 6012 and axle housing connecting sleeves 6015 arranged between the axle housings 601 to tightly fix the axle housings 601 on supporting racks 303 on the two sides, track shoes 701 which cover the supporting wheels 401 to form the flexible chain ring 101, grousers 702, track shoe reinforcing ribs 7011 which are used for dispersing the ground stress, wedge-shaped tenons 1021 which extend from the reinforcing ribs, track guide wheels 402, end track guide wheels 403 which act as tensioning wheels, end track guide wheel grouser grooves 4032, unit tracks 201 which are used for dispersing the ground stress, unit track screw holes 203, wedge-shaped mortises 2012 which are fit with the wedge-shaped tenons 1021 extending from the reinforcing ribs of the track shoe 701, unit track base plates 2013 which are used for increasing the rigidity of the unit tracks 201, unit track tire strips 2014 which are used for dispersing the pressure of the stress, unit track end edge covers 2011 and track unit side surface edge covers 2012 which are used for hooping the unit track tire strips 2014 in an assistant manner, a driving wheel 407, a driving shaft 406, a driving shaft bearing 4061, track protection wheels 501 which protect the unit tracks 201 to do warping and separating motion during revolution, axles 405, axle bearings 4051, a driving wheel flange plate 4071, track supporting wheels 301, and adjusting grooves 302 of the tensioning wheels.

A plurality of unit tracks 201 are uniformly distributed and arranged as a circle on the outer arc of the flexible chain ring 101. The unit tracks 201 are laid on the outer arc of the flexible chain ring 101 and are in longitudinal point connection with the flexible chain ring 101, the length of each unit track 201 is set in such a way that two or more supporting wheels 401 longitudinally or obliquely arranged on the axle housings 601 can be simultaneously held above each unit track 201. The supporting wheels 401 are installed on the axle housings 601 and are arranged according to certain longitudinal distribution curvature, and the longitudinal curvature of the unit tracks 201 is equal to or smaller than the longitudinal distribution curvature of the supporting wheels 401 arranged on the axle housings 601. The supporting wheels 401 are installed on the axle housings 601 along the longitudinal curvature, and a plurality of rows of supporting wheels 401 are abreast arranged and are longitudinally staggered. Two equal dividing lines are arranged in the span of axes of two longitudinally adjacent supporting wheels 401 Transversely adjacent supporting wheels 401 on the left and right are respectively arranged on the two equal dividing lines, and three adjacent supporting wheels 401 are obliquely arranged. The axle housing connecting sleeves 6015 are arranged between the axle housings 601 and are aligned with the axle housing connecting screw holes 6012. The axle housing connecting screws 6013 penetrate through the axle housing connecting screw holes 6012 to tightly fix the axle housings 601 on the supporting racks 303 on the two sides. The track supporting wheels 301 are longitudinally installed on the front and rear edges of the supporting racks. The longitudinal distribution curvature of the track supporting wheels 301 is equal to the minimum longitudinal distribution curvature of the supporting wheels 401 on the axle housings 601. The driving wheel 407 is installed at the top of a triangle, which obtains power through the driving shaft 406, and the driving wheel flange plate 4071 is used for connecting the supporting racks 303 and to driving wheel 407 onto a car body. The supporting wheels 401, the track supporting wheels 301, the end track guide wheels 403 and the driving wheel 407 are covered by the flexile chain ring 101. The flexible chain ring 101 comprises the unit tracks 201 used for dispersing stress from the ground and a rubber caterpillar track used for serially connecting the unit tracks. The grousers 702 are arranged on the inner arc of the rubber caterpillar track and are used for acting with the supporting wheels 401 and the track guide wheels 402 to induce the caterpillar track to longitudinally and stably run. The T-shaped tenons 1022 are arranged on the rubber caterpillar track and are fit with the T-shaped mortises 2022 on the unit tracks 201 with certain rigidity. The unit tracks 201 disperse and transfer stress from the ground through the intermediate rubber caterpillar track to the plurality of supporting wheels 401 above the unit tracks 201. The supporting wheels 401 also assist guiding the track, the end track guide wheels 403 at the front and rear parts of a caterpillar track device are fixedly connected onto the supporting racks 303 through the axles 405 and the axle bearings 4051. The end track guide wheels 403 induce the caterpillar track to wind and run. The end track guide wheel 403 grouser grooves are formed in the end track guide wheels 403 for allowing the grousers 702 to slide through during forward-backward winding and running of the caterpillar track and play a role of inducing the caterpillar track to wind and run along the longitudinal direction. Concave driving teeth are arranged on the outer arc of the driving wheel 407 at the top of the caterpillar track. The driving wheel 407 is connected with the driving shaft 406 through the axle bearings 4051 and drives the caterpillar track to wind and run by turning the caterpillar track driving teeth. The T-shaped tenons 1022 on the rubber caterpillar track are fit and connected with the T-shaped mortises 2022 on the unit tracks 201 to longitudinally and serially connect the unit tracks 201 to form a ring. The unit track base plates 2013 fix the unit track tire strips 2014 through the unit track end edge covers 2011 and the track unit side surface edge covers 2012. The unit track screw holes 203 which penetrate through the unit tracks 201 are formed at positions corresponding to the T-shaped tenons 1022 on the T-shaped mortises 2022 in the unit tracks 201, and screws are used for assisting the fixing of the unit tracks 201 on the T-shaped tenons 1022. The unit tracks 201 have longitudinal curvature equal to the minimum longitudinal distribution curvature of the supporting wheels 401 on the axle housings 601. Each unit track 201 is divided into a front part and a rear part by taking the position of a connecting point of each unit track 201 longitudinally connected with the flexible chain ring 101 as a dividing point. The position of the longitudinal connecting point on each unit track 201 connected with the flexible chain ring 101 is adjusted to enable the length of the rear part of the position from the connecting point of each unit track 201 to be greater than the length of the front part of the connecting point of each unit track 201. The inertial force and centrifugal force which are obtained by the rear part of each unit track 201 due to elongation and are greater than those of the front part of each unit track 201 are converted into prestress capable of prying the front part of each unit track 201 to get close to the flexible chain ring 101 by using the movement inertial force of each unit track 201 and the centrifugal force obtained during large-curvature revolution and by taking the connecting point of each unit track 201 and the flexible chain ring 101 as a supporting point. The rear part of each unit track 201 applies prestress capable of enabling the front end part of each unit track 201 to get close to the flexible chain ring 101 in advance to the front end part of each unit track 201 during large-curvature revolution, and thus the fulminant impact caused by each unit track 201 to the flexible chain ring 101 at the end of revolution is reduced.

Example 5

Figure 10:
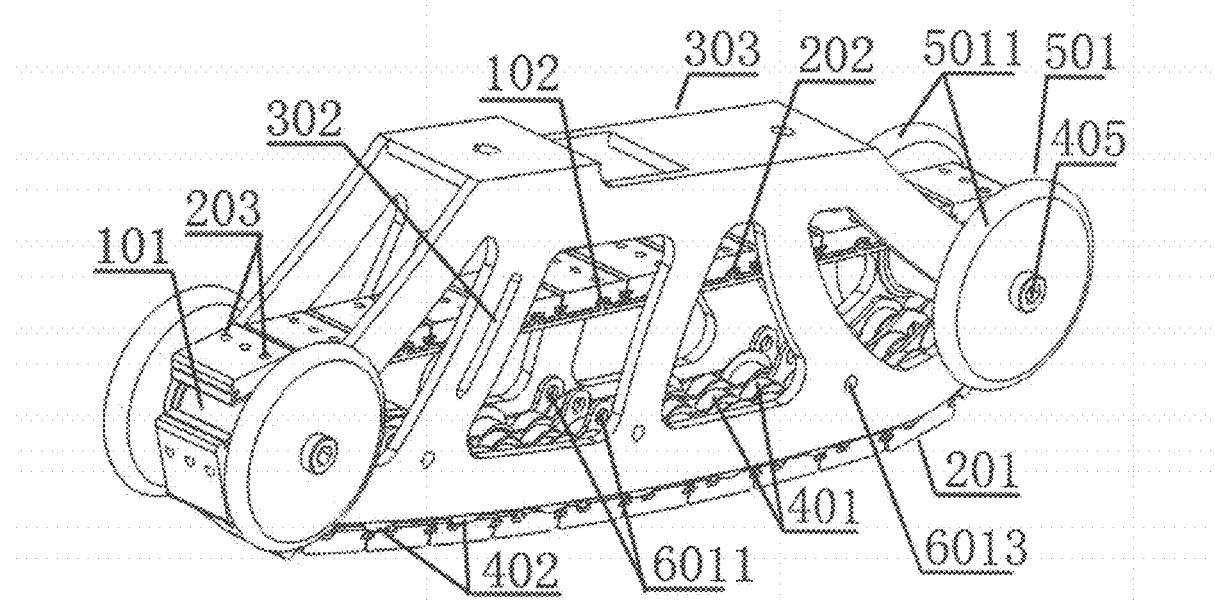
FIG. 10 is a structural oblique view of a caterpillar track wheel with division of work between track and chain, a method for fitting unit track with flexible chain ring and a method for buffering prestress according to the present invention applied to a staggered supporting wheel type caterpillar track.
Figure 11:
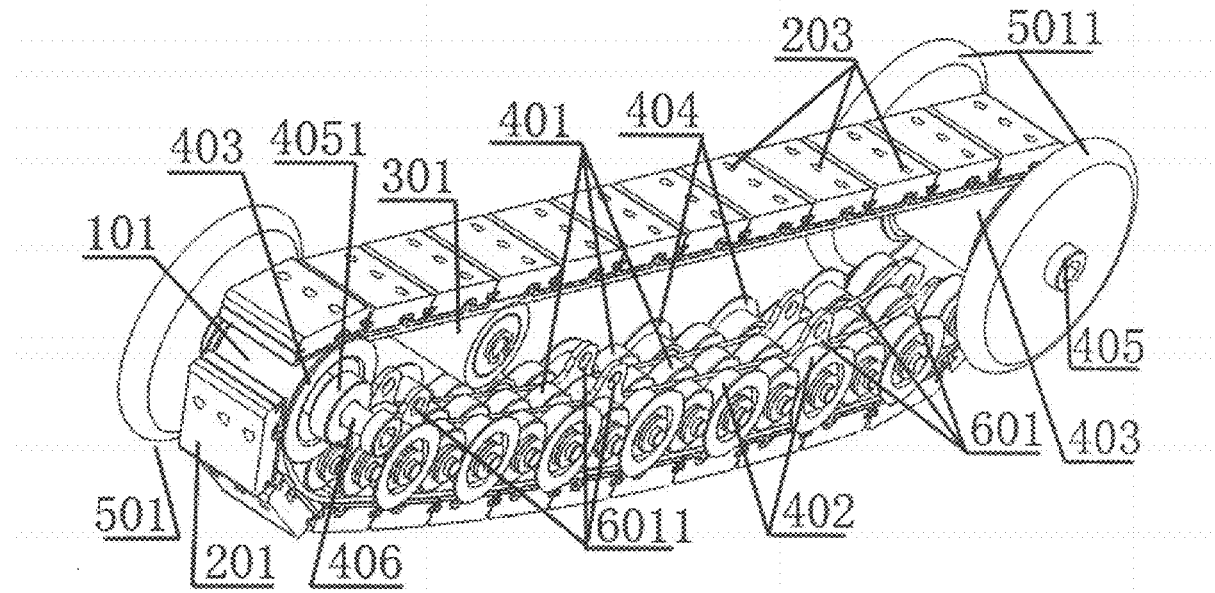
FIG. 11 is a structural schematic view of a caterpillar track wheel with division of work between track and chain, a method for fitting unit track with flexible chain ring and a method for buffering prestress according to the present invention applied to a staggered supporting wheel type caterpillar track.
Figure 12:
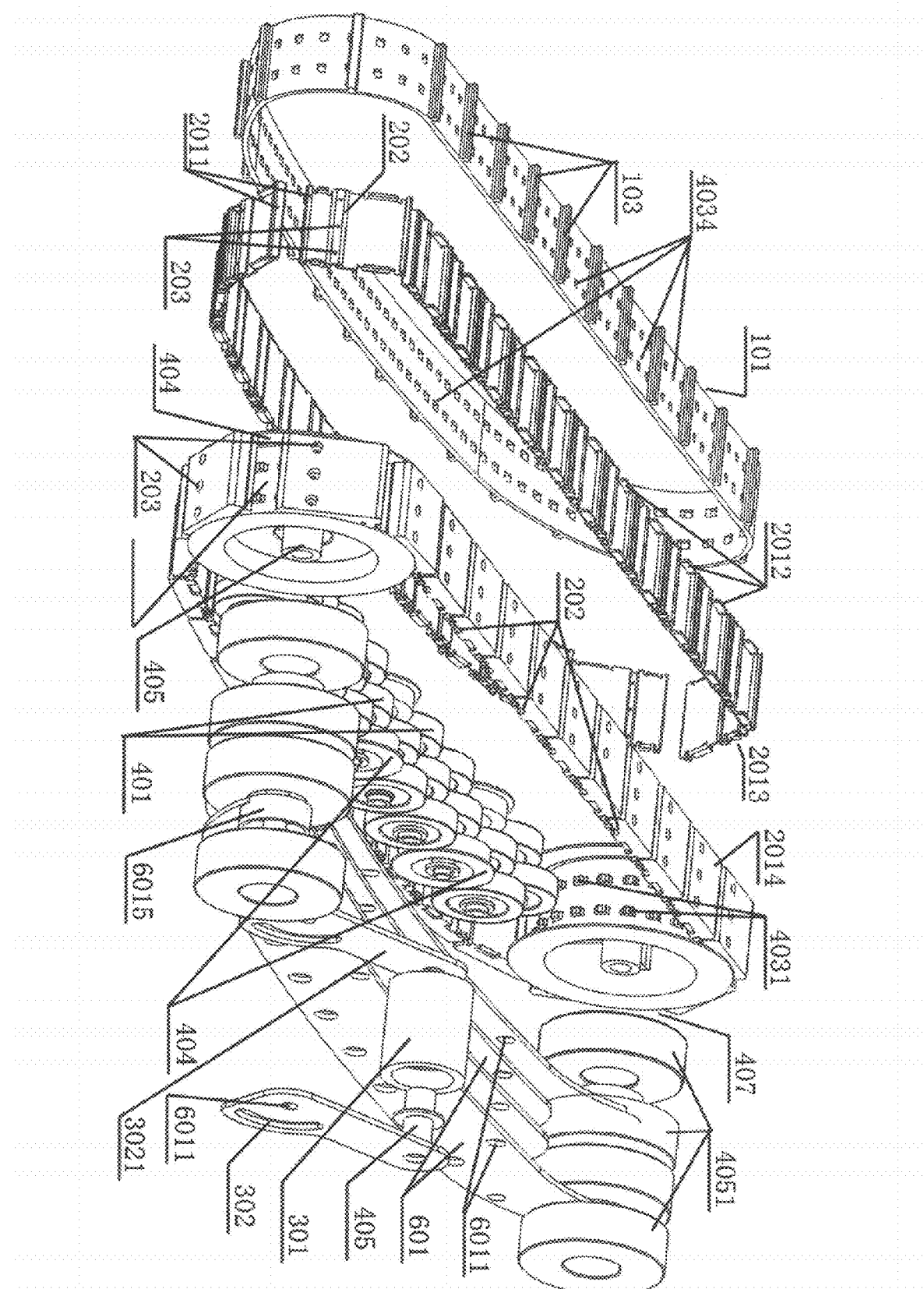
FIG. 12 is an exploded schematic view of a caterpillar track wheel with division of work between track and chain, a method for fitting unit track with flexible chain ring and a method for buffering prestress according to the present invention applied to a staggered supporting wheel type caterpillar track.

On the basis of referring to FIG. 1, FIG. 2 and FIG. 3, as shown in FIG. 10, FIG. 11 and FIG. 12, the example is application of a caterpillar track wheel with division of work between track and chain, a method for fitting unit track with flexible chain ring fitting and a method for buffering prestress on a staggered supporting wheel type rubber caterpillar track assembly. The caterpillar track wheel with division of work between track and chain comprises four rows of supporting wheels 401 which are longitudinally staggered and abreast arranged, axle housings 601 which are used for placing the supporting wheels 401, axle housing connecting screws 6013 which are used for fixedly connecting the axle housings 601 and penetrate through axle housing connecting screw holes 6012 and axle housing connecting sleeves 6015 arranged between the axle housings 601 to tightly fix the axle housings 601 on supporting racks 303 on the two sides, track shoes 701 which cover the supporting wheels 401 to form the flexible chain ring 101, grousers 702, track shoe reinforcing ribs 7011 which are used for dispersing the ground stress, wedge-shaped tenons 1021 which extend from the reinforcing ribs, track guide wheels 402, end track guide wheels 403, end track guide wheel grouser grooves 4032, unit tracks 201 which are used for dispersing the ground stress, unit track screw holes 203, wedge-shaped mortises 2012 which are fit with the wedge-shaped tenons 1021 extending from the track shoe reinforcing ribs, unit track base plates 2013 which are used for increasing the rigidity of the unit tracks 201, unit track tire strips 2014 which are used for dispersing the pressure of the stress, unit track end edge covers 2011 which are used for hooping the unit track tire strips 2014 in an assistant manner, a driving wheel 407, as driving shaft 406, a driving shaft bearing 4061, track protection wheels 501 which protect the unit tracks 201 to do warping and separating motion during revolution, axles 405, axle bearings 4051, track supporting wheels 301 and tensioning wheel adjusting grooves 302. The supporting wheels 401 are installed on the axle housings 601 along the longitudinal curvature, the four rows of supporting wheels 401 are abreast arranged and are longitudinally staggered, the axle housing connecting sleeves 6015 are arranged between the axle housings 601 and are aligned with the axle housing connecting screw holes 6012, the axle housing connecting screws 6013 penetrate through the axle housing connecting screw holes 6012 to tightly fix the axle housings 601 on the supporting racks 303 on the two sides, and the tensioning wheel adjusting grooves 302 are formed in the supporting racks, are used for adjusting the track supporting wheels 301 and thus play a role of adjusting the tension of a caterpillar track. The driving wheel 407 is installed at the rear part of a caterpillar track device, the driving wheel 407 obtains power through the driving shaft 406, the supporting wheels 401, the track supporting wheels 301, the end track guide wheels 403 and the driving wheel 407 are covered by the flexible chain ring 101, a circle of unit tracks 201 are uniformly distributed and arranged on the outer arc of the flexible chain ring 101, the unit tracks 201 are in longitudinal point connection with the flexible chain ring 101, convex tenons 102 are arranged on the flexible chain ring 101, and concave mortises 202 are formed in the unit tracks 201 and are fit with the convex tenons 102 on the flexible chain ring 101. Each unit track 201 is divided into a front part and a rear part by taking the position of a longitudinal connecting point of each unit track 201 connected with the flexible chain ring 101 as a dividing point. The position of the longitudinal connecting point on each unit track 201 connected with the flexible chain ring 101 is adjusted to enable the length of the rear part from the connecting point of each unit track 201 to be greater than the length of the front part from the connecting point of each unit track 201. The inertial force and centrifugal force which are obtained by the rear part of each unit track 201 due to elongation and are greater than those of the front part of the same unit track 201 are converted into prestress capable of prying the front part of each unit track 201 to get close to the flexible chain ring 101 by using the movement inertial force of each unit track 201 and the centrifugal force obtained during large-curvature revolution and by taking the connecting point of each unit track 201 and the flexible chain ring 101 as a supporting point, the rear part of each unit track 201 applies prestress capable of enabling the front end part of each unit track 201 to get close to the flexible chain ring 101 in advance to the front end part of each unit track 201 during large-curvature revolution, and thus the fulminant impact caused by each unit track 201 to the flexible chain ring 101 at the end of revolution is reduced.

The supporting wheels 401 and the track guide wheels 402 with track guide edges are installed on the axle housings 601 in a staggered manner and roll on the flexible chain ring 101. Track guide retaining edges 404 are arranged on the track guide wheels 402 and are used for inducing the longitudinal running of the caterpillar track. The track guide wheels 402 are distributed at an interval of one longitudinal supporting wheel, and the track guide edges act on the edges of the flexible chain ring 101 to induce the caterpillar track to longitudinally run. The wedge-shaped tenons 1021 are arranged on the rubber caterpillar track and are fit with the wedge-shaped mortises 2021 in the rigid unit track base plates 2013. The stress from the ground is partially dispersed by the unit track tire strips 2014 and then is transferred to the rigid unit track base plates 2013, and finally is transferred to the plurality of supporting wheels 401 above the unit tracks 201 through the rubber caterpillar track after being thoroughly dispersed by the unit track base plates 2013. The end track guide wheels 403 at the front and rear parts of a caterpillar track device are fixedly connected onto the supporting racks 303 through the axles 405 and the axle bearings 4051, which induce the caterpillar track to wind and run. The end track guide retaining edges 404 are arranged on the end track guide wheels 403 and are used for inducing the caterpillar track to longitudinally run during forward-backward winding and running of the caterpillar track. The driving wheel 407 is connected with the driving shaft 406 through the axle bearings 4051. The driving wheel 407 drives the caterpillar track to wind and run by turning the caterpillar track. The wedge-shaped tenons 1021 on the rubber caterpillar track are fit and connected with the wedge-shaped mortise 2021 in the unit track base plates 2013 to longitudinally and serially connect the unit tracks 201 to form a ring. The unit track screw holes 203 is provided through the unit track base plates 2013 and the unit track tire strips 2014 at positions, corresponding to the wedge-shaped tenons 1021, on the wedge-shaped mortises in the unit track base plates 2013, and screws are used to assist fixing the unit tracks 201 on the rigid transverse beams of the wedge-shaped tenons 1021. The unit tracks 201 have longitudinal curvature equal to the minimum longitudinal distribution curvature of the supporting wheels 401 on the axle housings 601. The curvature of the unit tracks takes a virtual circle center of the minimum distribution curvature of the supporting wheels 401 as a center. The inner arc and the outer arc of the unit tracks 201 in a side view are divided in an equal-angle manner by equal-angle dividing lines which radiate from the virtual circle center to form the length of the unit tracks 201, and sidelines at the front and rear ends of the unit tracks 201 are theoretically superposed and fit with the equal-angle dividing lines which radiate from the virtual circle center. The plurality of rows of supporting wheels 401 are abreast arranged in a longitudinally staggered manner on the axle housings 601 through independent axles 405. At least two or more than two equal dividing lines are arranged in the span of axes of two longitudinal supporting wheels. Transversely adjacent supporting wheels 401 on the left and right are respectively arranged on the equal dividing lines, and more than three adjacent supporting wheels 401 are obliquely arranged, so as to achieve the goals of infinitely reducing the longitudinal span between adjacent supporting wheels 401, increasing the number of corresponding supporting wheels 401 on one single unit track 201 and effectively dispersing the stress from the ground onto as many supporting wheels 401 as possible through the unit tracks 201.

Example 6

Figure 13:
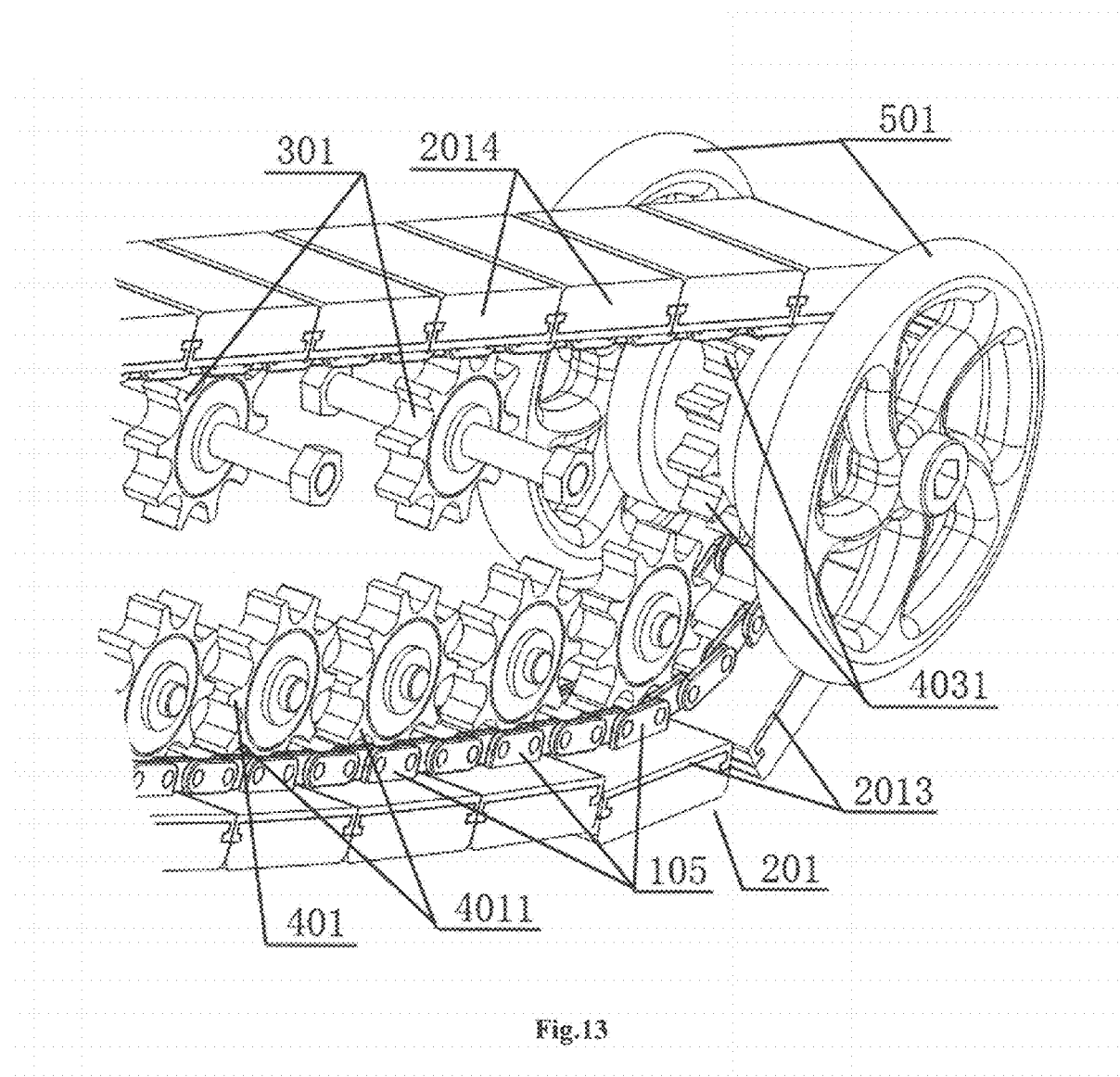
FIG. 13 is a structural schematic view of an example of a caterpillar track structure with division of work between track and chain of the present invention applied to a toothed supporting wheel type caterpillar track.
Figure 14:
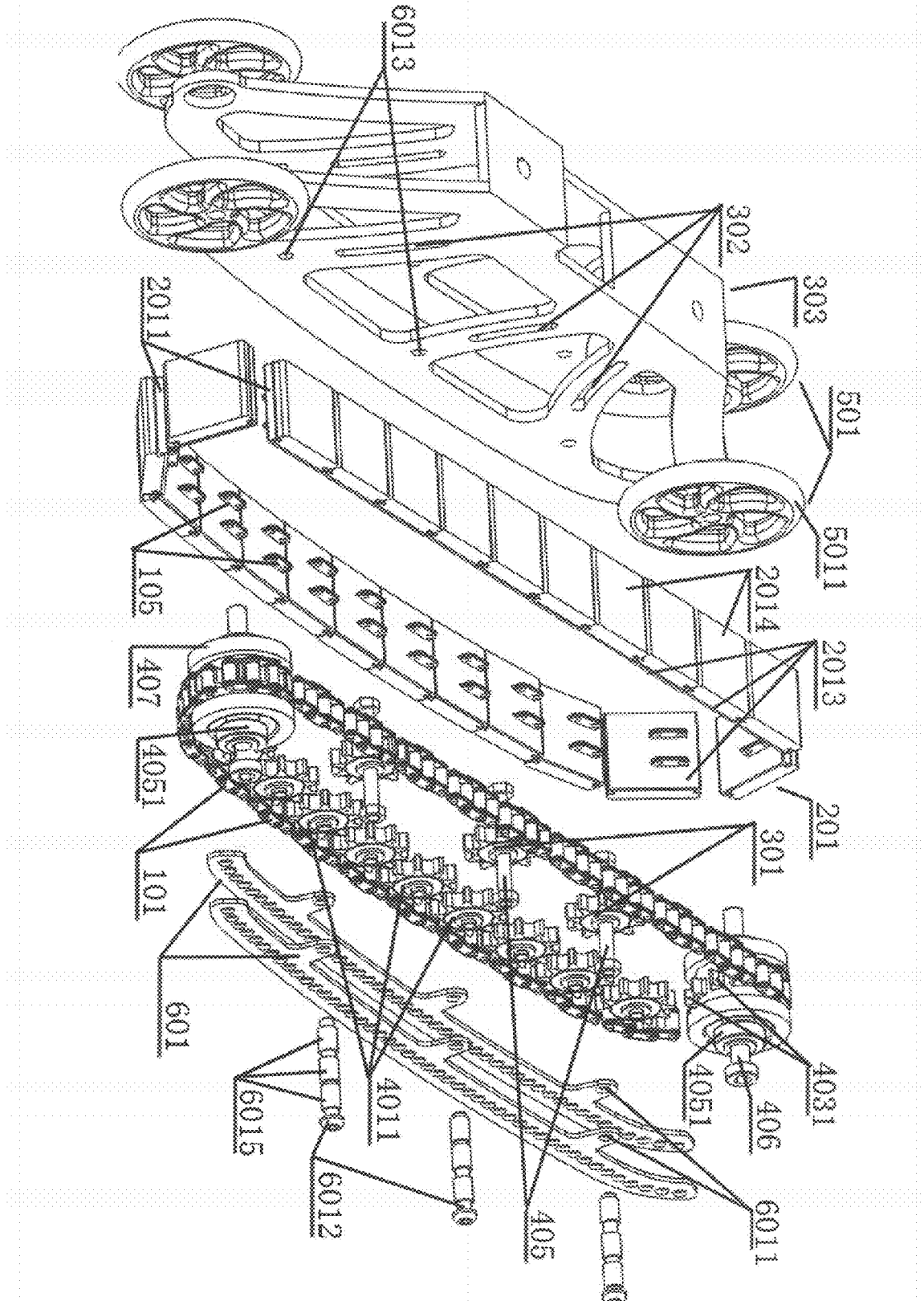
FIG. 14 is an exploded schematic view of an example of a caterpillar track structure with division of work between track and chain of the present invention applied to a toothed supporting wheel type caterpillar track.
Figure 15:
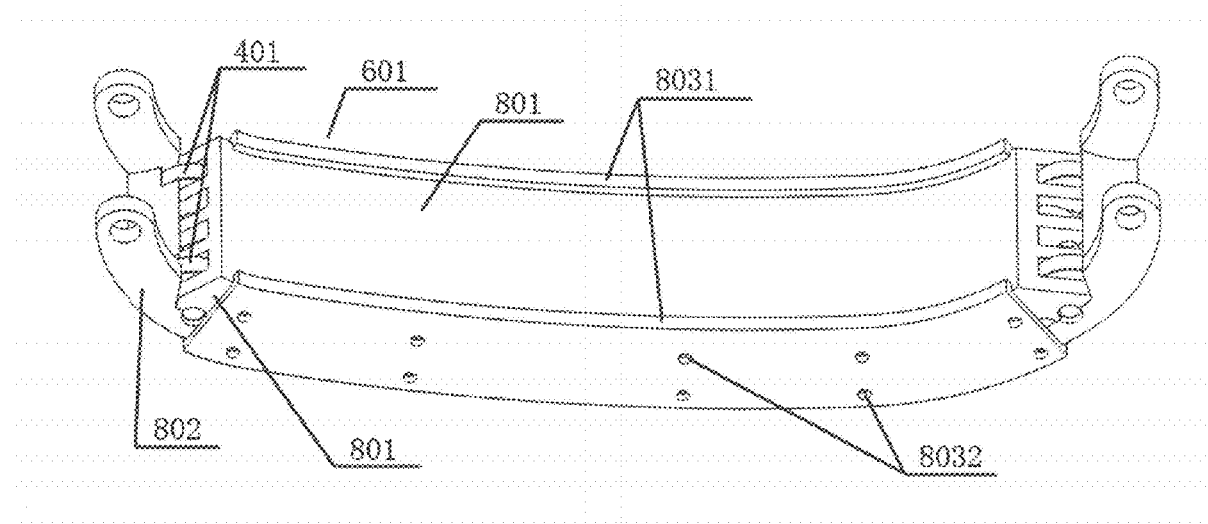
FIG. 15 is a schematic view of an assembly of the axle housing opening and closing structure using the method of opening and closing axle housing according to the present invention.
Figure 16:
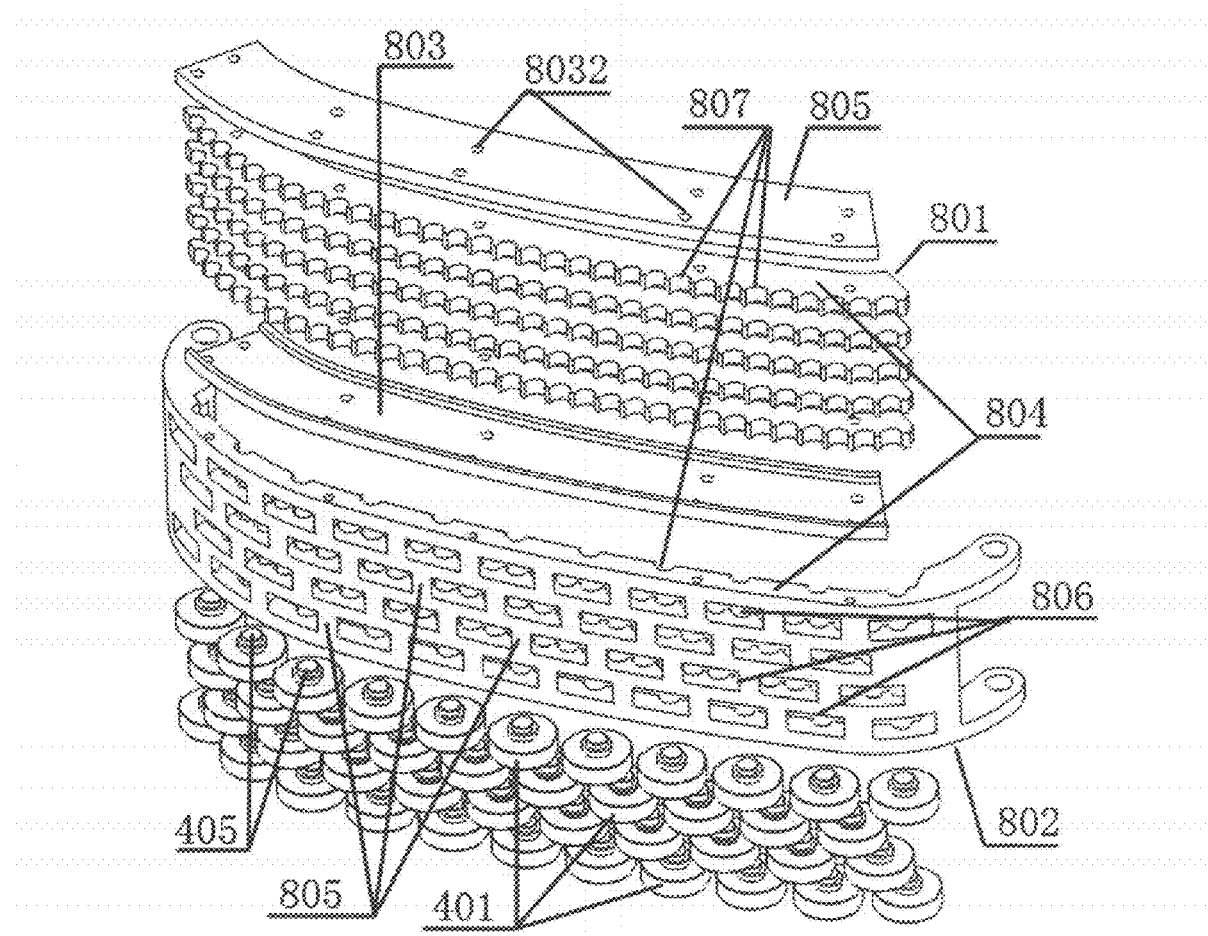
FIG. 16 is an exploded schematic view of an axle housing assembly using the method of opening and closing axle housing according to the present invention.
Figure 17:
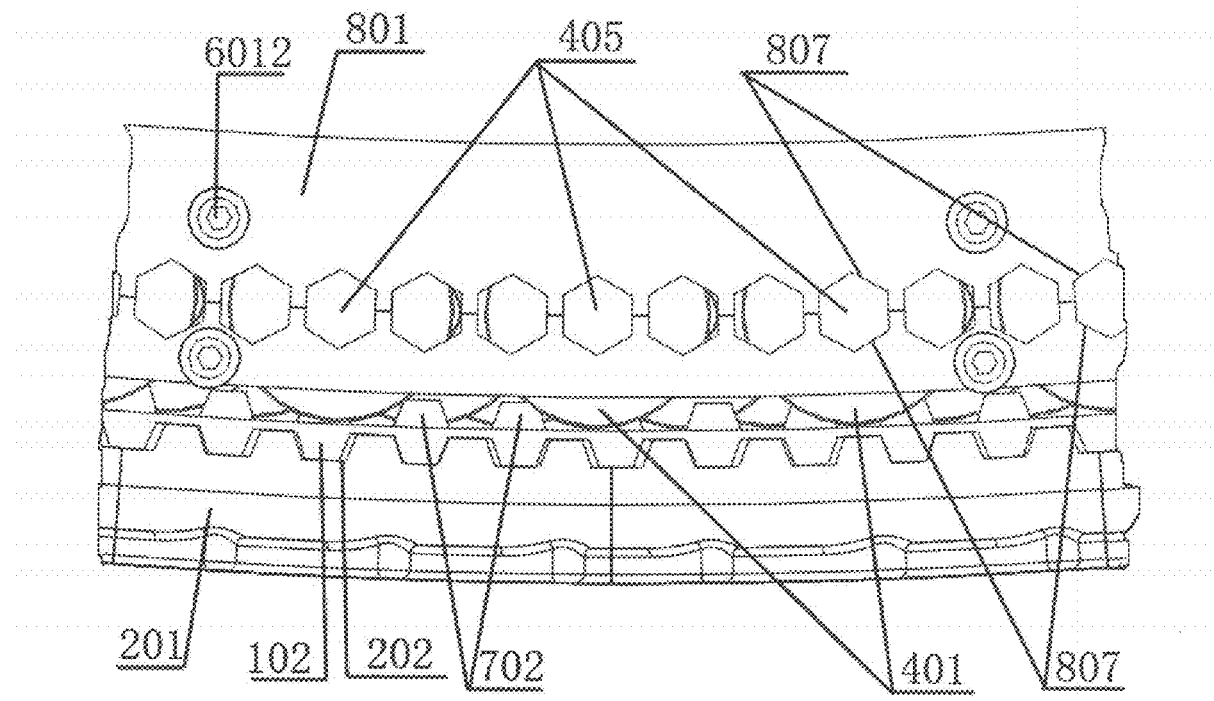
FIG. 17 is a schematic view of a polygonal fitting structure for axle and axle hole variation of the method of opening and closing axle housing according to the present invention.
Figure 18:
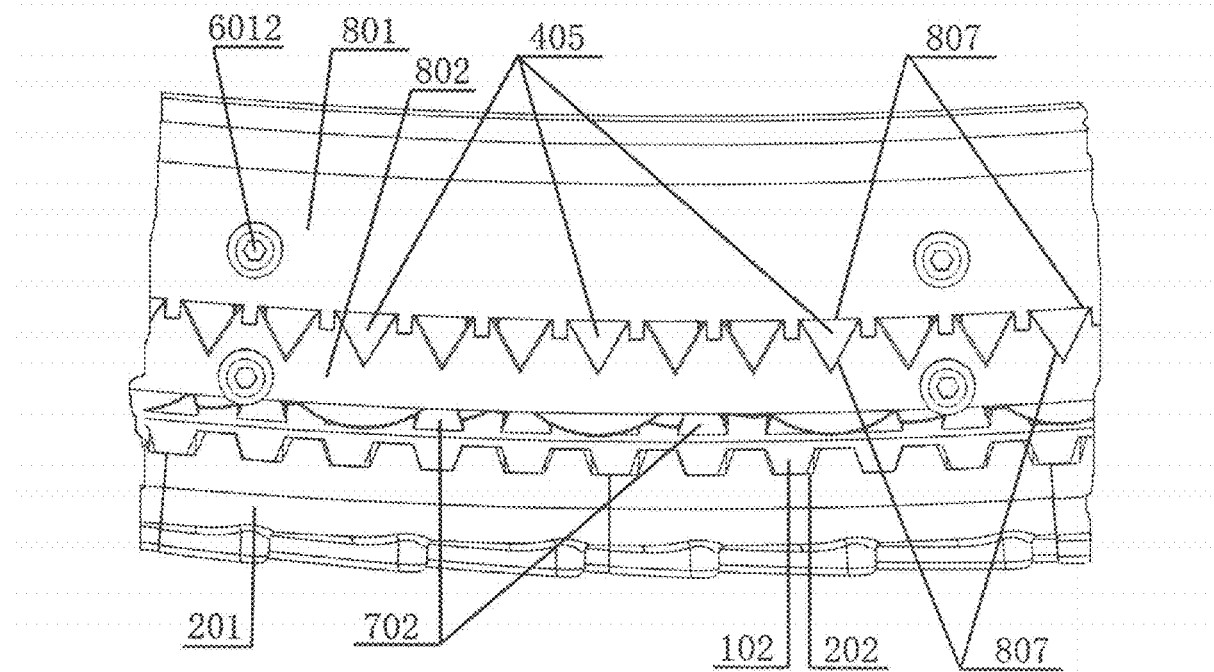
FIG. 18 is a schematic view showing a triangular fitting structure of an axle and axle hole variation in the method of opening and closing axle housing according to the present invention.
Figure 19:
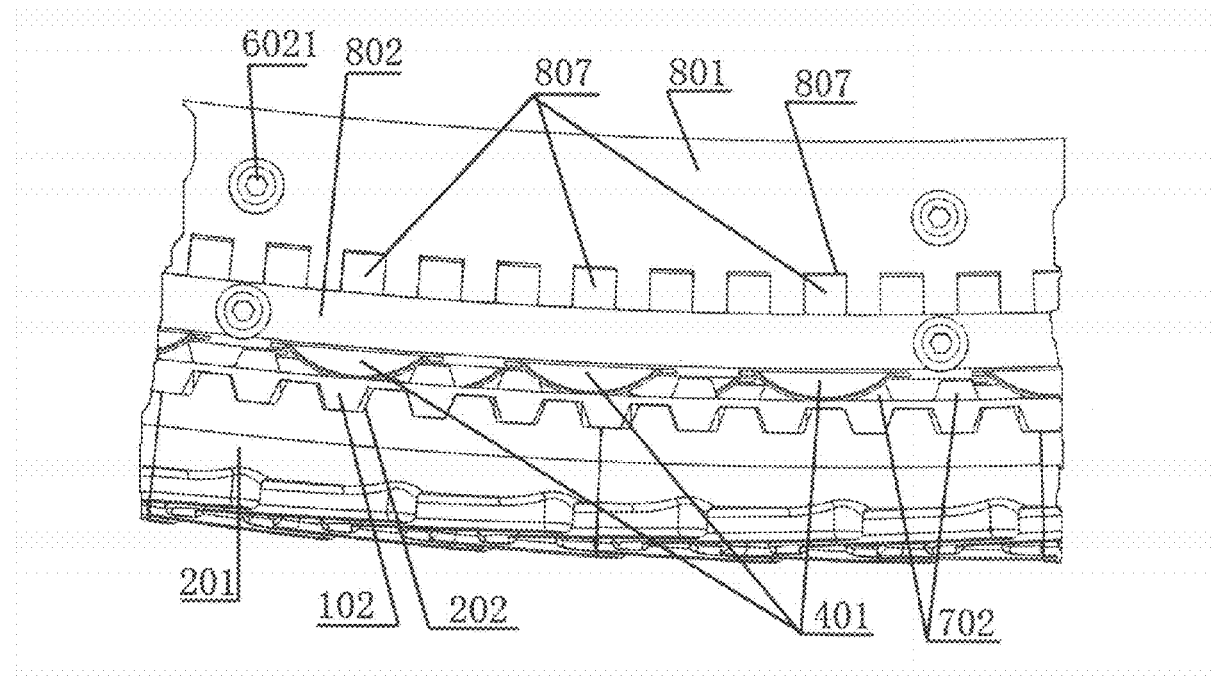
FIG. 19 is a schematic view showing a square fitting structure of an axle and axle hole variation in the method of opening and closing axle housing according to the present invention.
Figure 20:
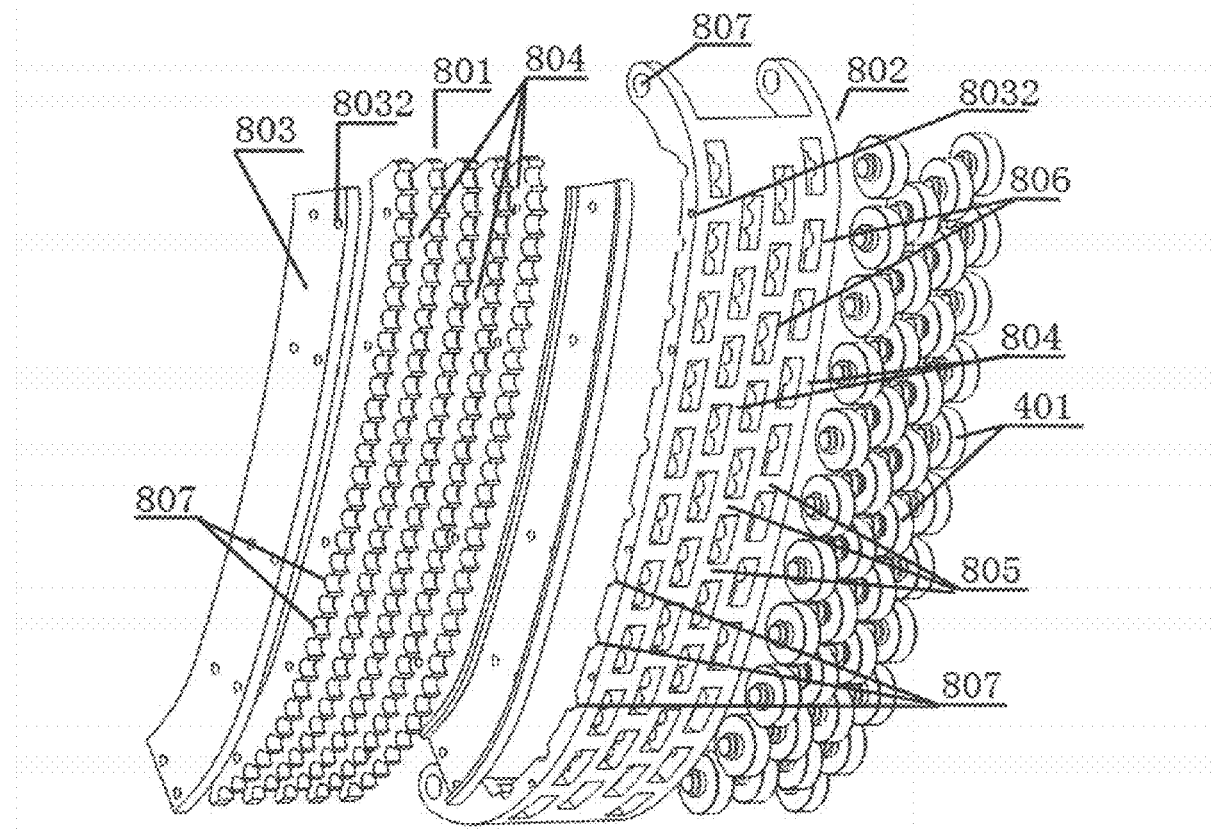
FIG. 20 is a structural exploded schematic view of an axle housing assembly using method of opening and closing axle housing according to the present invention.
Figure 21:
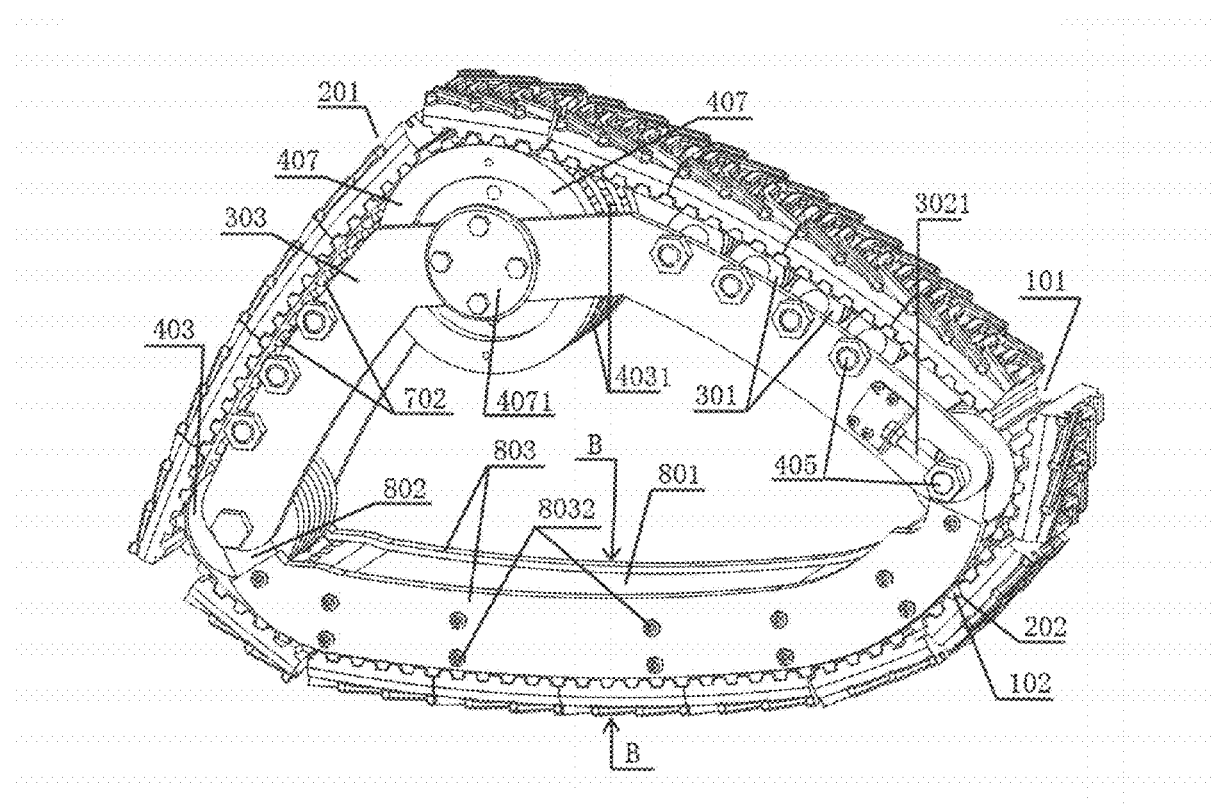
FIG. 21 is a side view of an integral structural showing a caterpillar track wheel with division of work between track and chain, a method for fitting the unit track with flexible chain ring, a method of buffering the prestress and a method of opening and closing the axle housing according to the present invention applied to a triangular caterpillar track wheel.
Figure 22:
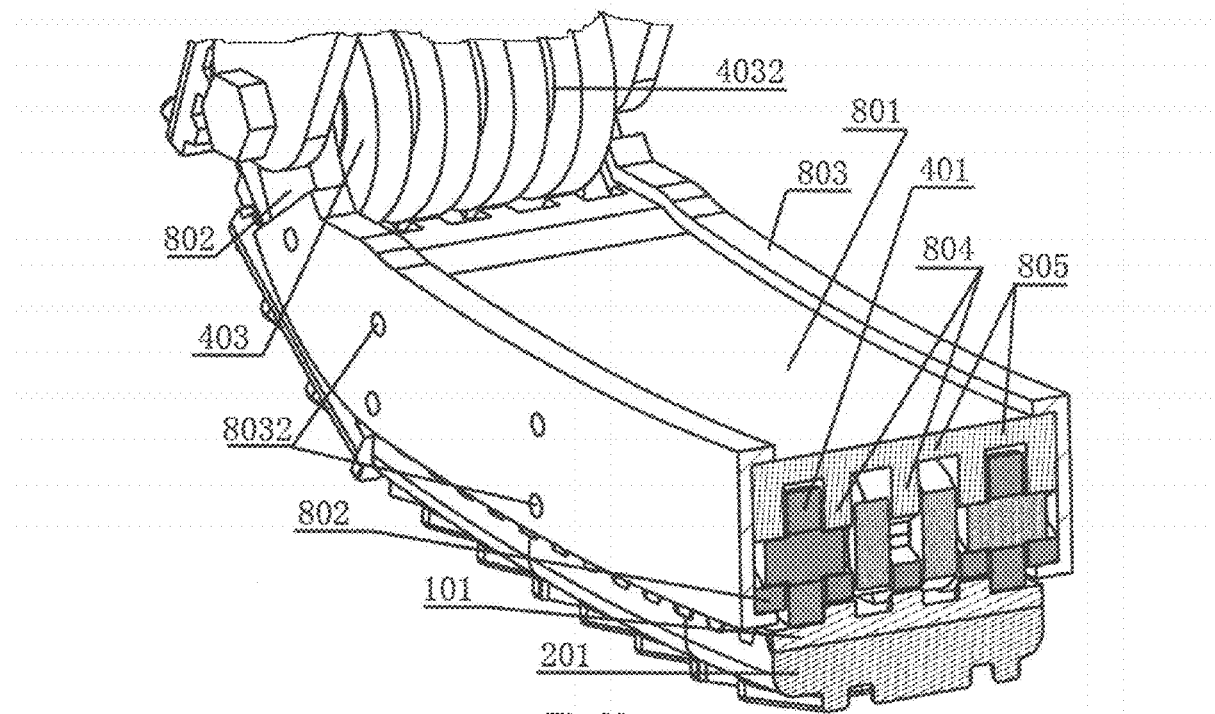
FIG. 22 is a sectional view along line B-B in FIG. 21.
Figure 23:
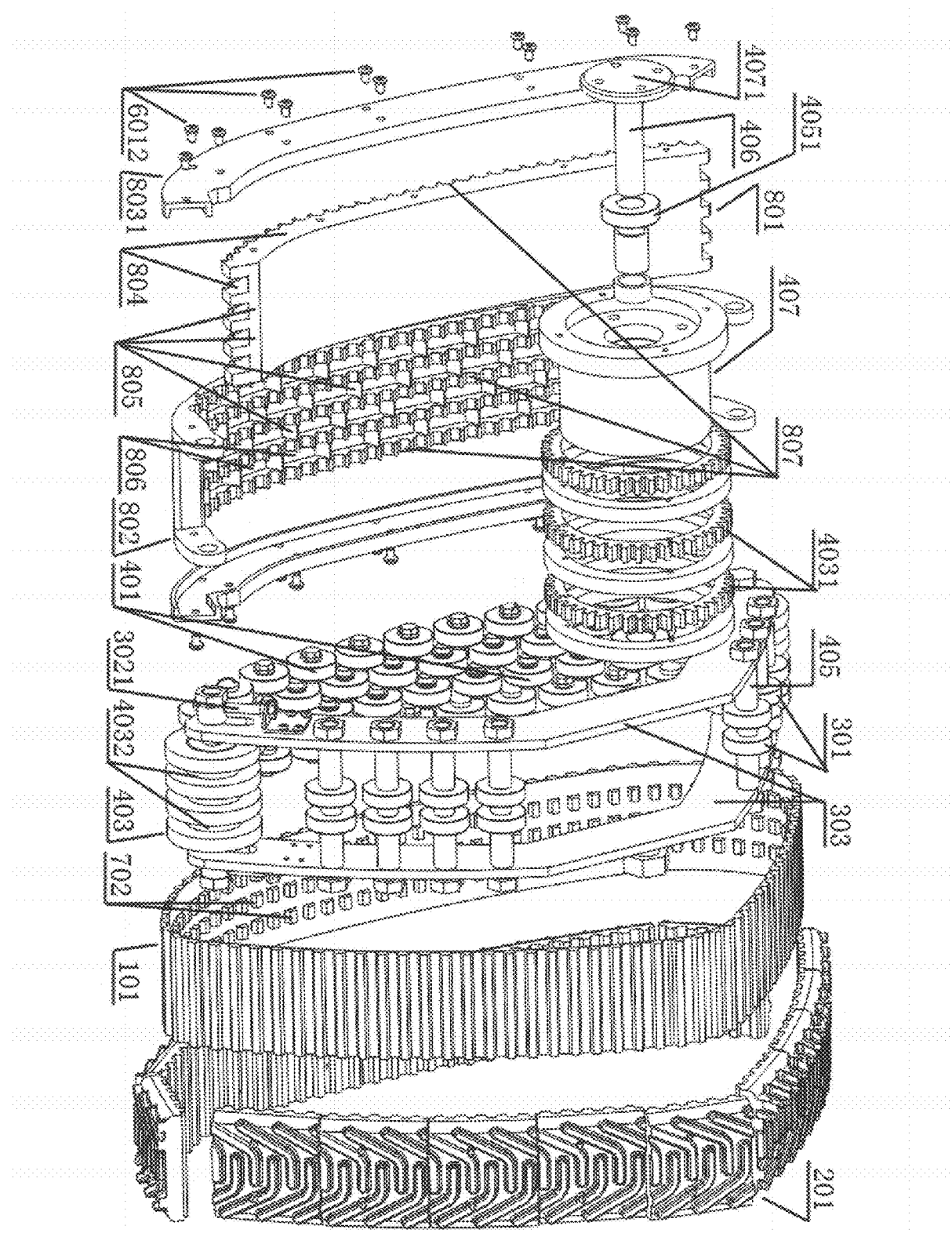
FIG. 23 is a structural exploded schematic view showing a caterpillar track wheel with division of work between track and chain, a method for fitting the unit track with flexible chain ring, a method of buffering the prestress and a method of opening and closing the axle housing according to the present invention applied to a triangular caterpillar track wheel assembly.

On the basis of referring to FIG. 1, FIG. 2, FIG. 3 and supporting racks 303 in FIG. 7, as shown in FIG. 13 and FIG. 14, the example is application of a caterpillar track wheel with division of work between track and chain, a method for fitting unit track with flexible chain ring fitting and a method for buffering prestress on a chain-driven toothed supporting wheel type caterpillar track assembly. The caterpillar track wheel with division of work between track and chain comprises a row of toothed supporting wheels 4011, axle housings 601 which are used for installing the toothed supporting wheels 4011, supporting racks 303, unit tracks 201, a chain, track threading link plates 105, end track guide wheels 403, end track guide wheel grouser grooves 4032, unit track screw holes 203, wedge-shaped tenons 1021, wedge-shaped mortises 2021 which are fit with the wedge-shaped tenons 1021, unit track base plates 2013 which are used for increasing the rigidity of the unit tracks 201, unit track tire strips 2014 which are used for dispersing the pressure of the stress, unit track end edge covers 2011 which are used for assisting hooping of the unit track tire strips 2014, a driving wheel 407, a driving shaft 406, a driving shaft bearing 4061, track protection wheels 501 which are used for protecting the unit tracks to do warping and separating motion during revolution, axles 405, axle bearings 4051 and track supporting wheels 301.

The axle housings 601 are tightly fixed on the supporting racks 303 on the two sides. A caterpillar track consisting of the unit tracks 201 and the chain covers the toothed supporting wheels 4011. Each unit track 201 covers four link plates, one of which is used as one track threading link plate 105 which is used for serially connecting the corresponding unit track 201 onto the chain covering the toothed supporting wheels 4011 fixedly arranged on the axle housings 601. Teeth of the toothed supporting wheels 4011 are fit with chain tooth holes, and the toothed supporting wheels 4011 roll on the chain in a fit manner. The toothed supporting wheels 4011 are installed on the axle housings 601 along the longitudinal curvature, one row of the toothed supporting wheels 4011 are installed on each of the axle housings. Axle housing connecting sleeves 6013 are aligned with axle housing connecting screw holes 6012. Axle housing connecting screws 6013 are used to penetrate through the axle housing connecting screw holes 6012 to tightly fix the axle housings 601 on the supporting racks 303 on the two sides. The track supporting wheels 301 are arranged on the supporting racks, and act like tensioning wheels 408 to adjust the tension of the caterpillar track through adjusting pull rods 3021 which are slidably supported in adjusting grooves 302. The longitudinal distribution curvature of the track supporting wheels 301 is equal to the minimum longitudinal distribution curvature of the toothed supporting wheels 4011 on the axle housings 601. The driving wheel 407 is arranged at the rear part of the caterpillar track to obtain power through the driving shaft 406. The supporting racks 303 are connected onto a car body. Thereafter, the toothed supporting wheels 4011, the track supporting wheels 301, the end track guide wheels 403 and the driving wheel 407 are covered by the flexible chain ring 101, the flexible chain ring 101 comprises the unit tracks 201 for dispersing the stress from the ground and the chain for serially connecting the unit tracks 201, through which the toothed supporting wheels 4011 are driven. The toothed supporting wheels 4011 simultaneously play the role of the track guide wheels for inducing the chain to longitudinally run and inducing the caterpillar track to keep longitudinal and stable running. The unit tracks 201 disperse and transfer the stress from the ground through the intermediate chain to the plurality of toothed supporting wheels 4011 above the unit tracks 201. The end track guide wheels 403 at the front and rear parts of a caterpillar track device are fixedly connected onto the supporting racks 303 through the axles 405 and the axle bearings 4051 to induce the caterpillar track to wind and run. End track guide wheel driving teeth 4031 are arranged on the end track guide wheels 403. The convex driving teeth 4031 are inserted into driving tooth holes 4034 of the flexible chain ring 101 to turn the caterpillar track to longitudinally move. Track guide retaining edges 404 are arranged on the end track guide wheels 403 and are used for inducing the caterpillar track to longitudinally wind and run during forward-backward winding and running of the caterpillar track. The driving wheel 407 at the rear part of the caterpillar track is connected with the driving shaft 406 through the axle bearings 4051 and is fit with the chain tooth holes through the driving teeth to turn the chain to wind and run. The unit tracks 201 have longitudinal curvature equal to the minimum longitudinal distribution curvature of the toothed supporting wheels 4011 on the axle housings 601. The caterpillar track wheel with division of work between track and chain is in the shape of a triangle from a side view. The distribution curvature of the track supporting wheels 301 arranged on the front and rear side of the triangle is equal to the minimum distribution curvature of the supporting wheels 401 on the axle housings 501. The longitudinal curvature of the unit tracks is fit with the longitudinal distribution curvature of the supporting wheels 401. The length of the unit tracks 201 is divided in an equal-angle manner by equal-angle dividing lines which radiate from the virtual circle center of the distribution curvature of the supporting wheels 401, and sidelines at the front and rear ends of the unit tracks 201 are theoretically superposed and fit with the equal-angle dividing lines which radiate from the virtual circle center. Each unit track 201 is divided into a front part and a rear part by taking the position of a connecting point of each unit track 201 longitudinally connected with the flexible chain ring 101 as a dividing point, the position of the longitudinal connecting point on each unit track 201 connected with the flexible chain ring 101 is adjusted to enable the length of the rear part of from the connecting point of each unit track 201 to be greater than that of the front part of the the same unit track 201. The inertial force and centrifugal force which are obtained by the rear part of each unit track 201 due to elongation and are greater than those of the front part of each unit track 201 are converted into prestress capable of prying the front part of each unit track 201 to get close to the flexible chain ring 101 by using the movement inertial force of each unit track 201 and the centrifugal force obtained curing large-curvature revolution and by taking the connecting point of each unit track 201 and the flexible chain ring 101 as a supporting point. The rear part of each unit track 201 applies prestress capable of enabling the front end part of each unit track 201 to get close to the flexible chain ring 101 in advance to the front end part of each unit track 201 during large-curvature revolution, and thus the fulminant impact caused by each unit track 201 to the flexible chain ring 101 at the end of revolution is reduced.

Example 7

On the basis of referring to FIG. 1, FIG. 2, FIG. 3, FIG. 7, FIG. 8, FIG. 9, FIG. 10, FIG. 11 and FIG. 12, as shown in FIG. 15, FIG. 16, FIG. 17, FIG. 18, FIG. 19, FIG. 20, FIG. 21, FIG. 22 and FIG. 23, the example is application of a caterpillar track wheel with division of work between track and chain, a method for fitting unit track with flexible chain ring, a method for buffering prestress and a method for opening and closing axle housing on a triangular caterpillar track wheel. The caterpillar track wheel with division of work between track and chain comprises supporting wheels 401, axle housings 601, upper axle housings 801, lower axle housings 802, axle housing hoops 803, axle holes 807, supporting wheel installation holes 806, screw holes 8032, unit tracks 201, supporting racks 303, a flexible chain ring 101, grousers 702, tenons 1021, end track guide wheels 403, end track guide wheel grouser grooves 4032, a driving wheel, a driving shaft 406, a driving shaft bearing 4061, axles 405, axle bearings 4051, a driving wheel flange plate 4071, and track supporting wheels 301, etc. A plurality of unit tracks 201 are uniformly distributed and arranged as a circle on the outer arc of the flexible chain ring 101. The unit tracks 201 are laid on the outer arc of the flexible chain ring 101 and are in longitudinal point connection with the flexible chain ring 101. Each unit track 201 is divided into a front part and a rear part with a connecting point at which a unit track 201 longitudinally connected with the flexible chain ring 101 being a dividing point. The longitudinal connecting point on each unit track 201 connected with the flexible chain ring 101 is adjusted to enable the length of the rear part from the connecting point of each unit track 201 to be greater than that of the front part of the unit track 201. The inertial force and centrifugal force generated by the rear part of each unit track 201 due to elongation and greater than those of the front part of each unit track 201 are converted into prestress capable of prying the front part of each unit track 201 to get close to the flexible chain ring 101 by using the movement inertial force of each unit track 201 and the centrifugal force obtained during large-curvature revolution and by taking the connecting point of each unit track 201 and the flexible chain ring 101 as a supporting point. The rear part of each unit track 201 applies prestress capable of enabling the front end part of each unit track 201 to get close to the flexible chain ring 101 in advance to the front end part of each unit track 201 during large-curvature revolution, and thus the fulminant impact caused by each unit track 201 to the flexible chain ring 101 at the end of revolution is reduced. The length of each unit track 201 is set in such a way that two or more supporting wheels 401 longitudinally or obliquely arranged on the axle housings 601 can be simultaneously held above each unit track 201. The supporting wheels 401 are installed on the axle housings 601 and are arranged according to certain longitudinal distribution curvature, and the longitudinal curvature of the unit tracks 201 is equal to or smaller than the longitudinal distribution curvature of the supporting wheels 401 arranged on the axle housings 601. Each axle housing 601 is longitudinally divided into an upper axle housing 801 and a lower axle housing 802 from the position of axle holes 807 which are thus sectioned into open holes. Groove-shaped axle housing hoops 803 are used and attached onto the side surfaces of the upper axle housings 801 and the corresponding lower axle housings 802. The inner side of the groove of each axle housing hoop 803 is horn-mouth-shaped, and the longitudinal length of each axle housing hoop 803 is close to the longitudinal arrangement length of the supporting wheels. The upper axle housings 801 and the corresponding lower axle housings 802 are squeezed into the grooves, which relatively and continuously become smaller, of the axle housing hoops 803 by tightening axle housing connecting screws 6012 for connecting the upper axle housings 801 and the corresponding lower axle housings 802, thus the upper axle housings 801 and the corresponding lower axle housings 802 are squeezed and tightly fixed together, and the open axle holes 807 respectively in the upper axle housings 801 and the corresponding lower axle housings 802 are closely combined in an arch way and fit together to form the corresponding closed complete axle holes 807. Open axle holes 807 are formed in axle housing longitudinal beams 804 of the lower axle housings 802. The plurality of parallel axle housing longitudinal beams 804 are transversely and integrally connected through axle housing transverse beams 805 which penetrate through gaps below the supporting wheels 401, thus a plurality of vertical through holes are formed in the lower axle housings 802, and the vertical through holes are the supporting wheel installation holes 805. Open axle holes 807 are also formed in the axle housing longitudinal beams 804 of the upper axle housings 801, and the axle housing longitudinal beams 804 of the upper axle housings are transversely and integrally connected at the top. The axles 405 of the supporting wheels 401 are installed along the longitudinal curvature in the axle holes 807 of the axle housings 601. The plurality of rows of supporting wheels 401 are abreast arranged and are longitudinally staggered. Two equal dividing lines are arranged in the span of axes of two longitudinally adjacent supporting wheels 401. Transversely adjacent supporting wheels 401 on the left and right are respectively arranged on the two equal dividing lines. Three adjacent supporting wheels 401 are obliquely arranged. The front and rear ends of the lower axle housings 802 are fixedly arranged on the axles 405 of the front and rear end track guide wheels 403. The upwards arched and raised supporting racks 303 are further fixedly arranged on the axles 405. The track supporting wheels 301 are longitudinally installed in the forward-backward direction of the supporting racks 303 which move relative to the driving wheel 407 through bearings. The longitudinal distribution curvature of the track supporting wheels 301 is equal to the minimum longitudinal distribution curvature of the supporting wheels 401 on the axle housings 601. The driving wheel 407 is installed at the top of the triangular caterpillar track for obtaining power through the driving shaft 406, and the driving wheel flange plate 4071 is used for connecting the driving wheel 407 onto a car body transmission shaft. The supporting wheels 401, the track supporting wheels 301, the end track guide wheels 403 and the driving wheel 407 are covered by the flexible chain ring 101 which comprises the unit tracks 201 used for dispersing the stress from the ground and a rubber caterpillar track used for serially connecting the unit tracks. The grousers 702 are arranged on the inner arc of the caterpillar track and are used for acting with the supporting wheels 401 and the end track guide wheel grouser grooves 4032 to induce the caterpillar track to keep longitudinal and stable running. The tenons 102 are arranged on the rubber caterpillar track and are fit with the mortises 202 on the unit tracks 201 with certain rigidity. The unit tracks 201 disperse and transfer the stress from the ground through the intermediate rubber caterpillar track to the plurality of supporting wheels 401 above the unit tracks 201. The supporting wheels 401 also play a role of assisting guiding of the track. The end track guide wheels 403 at the front and rear parts of a caterpillar track device are fixedly connected onto the supporting racks 303 and the ends of the lower axle housings 802 through the axles 405 and the axle bearings 4051. The end track guide wheel grouser grooves 4032 are formed in the end track guide wheels 403 for allowing the grousers 702 to slide through during forward-backward winding and running of the caterpillar track and play a role of inducing the caterpillar track to wind and run along the longitudinal direction. Concave driving teeth 4031 are arranged on the outer arc of the driving wheel 407 at the top of the caterpillar track. The driving shaft 406 penetrates through the axle bearings 4051 on the supporting racks 303 and is connected with the driving wheel 407 which drives the caterpillar track to wind and run by turning the caterpillar track grousers 702. The tenons 102 on the rubber caterpillar track are fit and connected with the mortises 202 on the unit tracks 201 to longitudinally and serially connect the unit tracks 201 to form a ring, and the unit tracks 201 have longitudinal curvature equal to the minimum longitudinal distribution curvature of the supporting wheels 401 on the axle housings 601. A plurality of unit tracks 201 are uniformly distributed and arranged as circle on the outer arc of the flexible chain ring. The unit tracks 201 are in longitudinal point connection with the flexible chain ring 101. Each unit track 201 is divided into a front part and a rear part with a longitudinal connecting point at which as unit track 201 connects with the flexible chain ring 101 as a dividing point. The position of the longitudinal connecting point at which the unit track 201 is connected with the flexible chain ring 101 is adjusted to enable the length of the rear part from the connecting point of each unit track 201 to be greater than that of the front part of the same unit track 201. The inertial force and centrifugal force which are generated by the rear part of each unit track 201 due to elongation and are greater than those of the front part of each unit track 201 are converted into prestress capable of prying the front part of each unit track 201 to get close to the flexible chain ring 101 by using the movement inertial force of each unit track 201 and the centrifugal force obtained during large-curvature revolution and by taking the connecting point of each unit track 201 and the flexible chain ring 101 as a supporting point. The rear part of each unit track 201 applies prestress capable of enabling the front end part of each unit track 201 to get close to the flexible chain ring 101 in advance to the front end part of each unit track 201 during large-curvature revolution, and the this fulminant impact caused by each unit track 201 to the flexible chain ring 101 at the end of revolution is reduced. The convex tenons 102 are arranged on the flexible chain ring 101, and the concave mortises 202 are formed in the unit tracks 201 and are fit with the convex tenons 102 on the flexible chain ring. Each axle housing 601 is longitudinally divided into an upper axle housing 801 and a lower axle housing 802 from the position of the axle holes 807. The upper axle housings 801 and the corresponding lower axle housings 802 are fixedly hooped together through mechanical parts to jointly form the axle holes 807, and the axles 405 of the supporting wheels 401 are installed in the axle holes 807. The groove-shaped axle housing hoops 803 are arranged on the side surfaces of the upper axle housings 801 and the lower axle housings 802. The upper axle housings 801 and the corresponding lower axle housings 802 are squeezed into grooves, which continuously and relatively become smaller, of the groove-shaped axle housing hoops 803 by tightening screws for connecting the upper axle housings 801 or the lower axle housings 802 on the side surfaces of the groove-shaped axle housing hoops 803, and thus the upper axle housings 801 and the corresponding lower axle housings 802 are hooped, squeezed and fixed together. The axle housing transverse beams 805 are arranged between the axle housing longitudinal beams 804 of the upper axle housings 801 or the lower axle housings 802, and the axle housing transverse beams 805 penetrate through gaps between longitudinally adjacent supporting wheels 401 to integrally connect and fix the abreast longitudinal axle housing longitudinal beams 804.

Certain examples of the present invention are described above in conjunction with the figures. However, the present invention is not limited to the above-mentioned specific examples, which are just exemplary but not restrictive. One skilled in the art can also make numerous forms and variations, without departing from the protection scope of the purposes and claims of the present invention, under the inspiration of the present invention. However, all of those forms and variations shall belong to the protection scope of the patent of the present invention.

I claim:

1. A method for fitting unit track to a flexible chain ring of a caterpillar track wheel with division of work between track and chain, the caterpillar track wheel with division of work between track and chain comprising a flexible chain ring (101) and unit tracks (201), characterized in that raised tenons (102) are arranged on said flexible chain ring (101), and depressed mortises (202) are arranged on said unit tracks (201) and are fit with the raised tenons (102) on the flexible chain ring (101);

wherein the tenons (102) comprise rigid tenon beams (103) disposed therein; one or more unit track screw holes (203) which penetrate through said unit track (201) are formed in the mortise (202) of the unit track (201), and screws penetrate through the unit track screw holes (203) to assist a fixed connection of the unit tracks (201) to the rigid tenon beams (103) embedded in the tenons (102) of the flexible chain ring (101).

2. The method for fitting unit track and flexible chain ring of a caterpillar track wheel with division of work between track and chain according to claim 1, characterized in that rigid unit track base plates (2013) are arranged on a side of said unit tracks (201) towards the supporting wheels (401).

3. The method for fitting unit track and flexible chain ring of a caterpillar track wheel with division of work between track and chain according to claim 1 or claim 2, characterized in that said flexible chain ring (101) is a rigid chain and said rigid chain is connected with the base plates of the unit tracks (201) through the track threading link plates (105).

4. The method for fitting unit track and flexible chain ring of a caterpillar track wheel with division of work between track and chain according to claim 1, characterized in that said tenons (102) and mortises (202) are shaped to have a bigger upper part and smaller lower part, which is suitable for tractive fixation and fitting.

5. An opening and closing type axle housing, characterized in that said axle housing (601) is longitudinally divided into an upper axle housing (801) and a lower axle housing (802) from the position of axle holes (807), the upper axle housing (801) and the lower axle housing (802) are fixedly hooped together through mechanical parts to jointly form the axle holes (807), and axles (405) of the supporting wheels (401) are installed in the axle holes (807);

wherein the upper axle housing (801) and the lower axle housing (802) comprise groove-shaped axle housing hoops (803) arranged on side surfaces thereof; the upper axle housing (801) and the lower axle housing (802) are squeezed into grooves which continuously and correspondingly become smaller by tightening screws for connecting the upper axle housing (801) or the lower axle housing (802) on the side surfaces of the groove-shaped axle housing hoops (803), to make the upper axle housing (801) and the lower axle housing (802) be hooped, squeezed and fixed together.

6. The opening and closing type axle housing according to claim 5, characterized in that axle housing transverse beams (805) are arranged between axle housing longitudinal beams (804) of said upper axle housing (801) or of said lower axle housing (802), and said axle housing transverse beams (805) penetrate through gaps between longitudinal adjacent supporting wheels (401) to integrally connect and fix the abreast longitudinal axle housing longitudinal beams (804).

7. A method for buffering prestress of unit tracks in a caterpillar track wheel with division of work between track and chain comprising a flexible chain ring (101) and the unit tracks (201), characterized in that a set of unit tracks (201) are uniformly arranged on the outer arc of said flexible chain ring (101), the unit tracks (201) are in point connection with the flexible chain ring (101) longitudinally, each unit track (201) comprises a front part and a rear part delimited by a connecting point at which the unit track (201) is connected with the flexible chain ring (101) longitudinally, the position of the connecting point on each unit track (201) connected with the flexible chain ring (101) is adjusted to make the length of the rear part of each unit track (201) be greater than that of the front part, so that by means of the movement inertial force of each unit track (201) and the centrifugal force obtained during large-curvature revolution and by taking the connecting point of each unit track (201) and the flexible chain ring (101) as a supporting point, the inertial force and centrifugal force which are obtained by the rear part of each unit track (201) and are greater than those of the front part of the unit track (201) due to elongation of the rear part are converted into prestress capable of prying the front part of the unit track (201) to get close to the flexible chain ring (101), thereby making the rear part of each unit track (201) apply prestress capable of enabling the front end part of each unit track (201) to get close to the flexible chain ring (101) in advance to the front end part of the unit track (201) during large-curvature revolution, thus facilitating lessening of the fulminant impact caused by each unit track (201) to the flexible chain ring (101) at the end of revolution.

8. The method for buffering prestress of unit tracks in a caterpillar track wheel with division of work between track and chain according to claim 7, characterized in that rigid unit track base plates (2013) are arranged on a side of said unit tracks (201) towards the supporting wheels (401).

9. The method of buffering prestress of unit tracks in a caterpillar track wheel with division of work between track and chain according to claim 8, characterized in that said flexible chain ring (101) is a rigid chain and said rigid chain is connected with the base plates of the unit tracks (201) through the track threading link plates (105).

* * * * *